(12) United States Patent
Molina-Markham

(10) Patent No.: US 11,313,973 B2
(45) Date of Patent: Apr. 26, 2022

(54) SYSTEMS AND METHODS FOR SATELLITE-BASED NAVIGATION

(71) Applicant: The MITRE Corporation, McLean, VA (US)

(72) Inventor: Andres D. Molina-Markham, McLean, VA (US)

(73) Assignee: The MITRE Corporation, McLean, VA (US)

( * ) Notice: Subject to any disclaimer, the term of this patent is extended or adjusted under 35 U.S.C. 154(b) by 324 days.

(21) Appl. No.: 16/386,995

(22) Filed: Apr. 17, 2019

(65) Prior Publication Data

US 2019/0317221 A1    Oct. 17, 2019

Related U.S. Application Data

(60) Provisional application No. 62/658,984, filed on Apr. 17, 2018.

(51) Int. Cl.
  *G01S 19/21* (2010.01)
  *G01S 19/47* (2010.01)
  (Continued)

(52) U.S. Cl.
  CPC ............ *G01S 19/215* (2013.01); *G01S 19/21* (2013.01); *G01S 19/45* (2013.01); *G01S 19/47* (2013.01); *G01S 19/48* (2013.01); *G01S 19/49* (2013.01)

(58) Field of Classification Search
  CPC ........ G01S 19/215; G01S 19/21; G01S 19/47; G01S 19/48; G01S 19/49; G01S 19/45; G01S 19/015
  (Continued)

(56) References Cited

U.S. PATENT DOCUMENTS 5,557,284 A * 9/1996 Hartman ............... G01S 19/215
                                                            342/357.29
7,940,210 B2    5/2011 Fly et al.
(Continued)

FOREIGN PATENT DOCUMENTS

EP    1965219 A1    9/2008
EP    1970723 A1    9/2008

OTHER PUBLICATIONS

Kalman (1960). "A New Approach to Linear Filtering and Prediction Problems", Transactions of the ASME—Journal of Basic Engineering 82(Series D):35-45.
(Continued)

*Primary Examiner* — Chuong P Nguyen
(74) *Attorney, Agent, or Firm* — Morrison & Foerster LLP

(57) ABSTRACT

A method for determining position of a mobile system, the method includes receiving global navigation satellite (GNSS) signals by a receiver of the mobile system, generating a plurality of position estimates based on at least pseudo-distances determined from at least some of the GNSS signals, wherein each position estimate is generated based on a different set of pseudo-distances, determining an inconsistency in one or more of the position estimates based on verification information, generating a trust assessment for each position estimate based on determined inconsistencies, outputting a position estimate associated with a higher trust assessment as a position of the mobile platform, and reducing an influence of a GNSS signal on a future position estimate generation based on a lower trust assessment for position estimates generated based on the GNSS signal.

27 Claims, 13 Drawing Sheets

(51) Int. Cl.
  *G01S 19/45* (2010.01)
  *G01S 19/48* (2010.01)
  *G01S 19/49* (2010.01)

(58) Field of Classification Search
  USPC .............. 342/357.59, 357.28, 357.3, 357.31, 342/357.32
  See application file for complete search history.

(56) References Cited

U.S. PATENT DOCUMENTS

| | | | | |
|---|---|---|---|---|
| 7,956,803 | B2* | 6/2011 | Thomson | G01S 19/215 |
| | | | | 342/357.59 |
| 8,600,671 | B2* | 12/2013 | Wang | G01S 19/47 |
| | | | | 701/468 |
| 8,742,984 | B2 | 6/2014 | Trautenberg | |
| 8,838,334 | B2 | 9/2014 | Wendel | |
| 8,922,427 | B2* | 12/2014 | Dehnie | G01S 19/47 |
| | | | | 342/357.58 |
| 8,948,392 | B2 | 2/2015 | Chassagne | |
| 9,494,691 | B2 | 11/2016 | Gum et al. | |
| 9,513,129 | B2* | 12/2016 | Wang | G01C 21/165 |
| 9,753,142 | B2 | 9/2017 | Broussalian | |
| 10,094,930 | B2* | 10/2018 | Schipper | G01S 19/29 |
| 10,365,376 | B2* | 7/2019 | Lee | G01S 1/24 |
| 10,641,906 | B2* | 5/2020 | Altrichter | G01S 19/26 |
| 10,809,388 | B1* | 10/2020 | Carcanague | G01S 19/44 |
| 10,908,293 | B2* | 2/2021 | Whitehead | G01S 19/215 |
| 11,163,068 | B2* | 11/2021 | Balog | G01S 19/215 |
| 2015/0268354 | A1 | 9/2015 | Monnerat et al. | |
| 2016/0178752 | A1* | 6/2016 | Davies | G01S 19/426 |
| | | | | 342/357.58 |
| 2016/0370466 | A1 | 12/2016 | Rougerie et al. | |
| 2016/0377726 | A1 | 12/2016 | Schipper et al. | |
| 2021/0109230 | A1* | 4/2021 | Söderholm | G01S 19/256 |

OTHER PUBLICATIONS

Urbina et al. "Limiting the Impact of Stealthy Attacks on Industrial Control Systems", ACM SIGSAC Conference on Computer and Communications Security, Oct. 24-28, 2016, Vienna, Austria; pp. 1092-1105.
Bach et al. "Learning the Structure of Generative Models without Labeled Data," Proceeding of the 34th International Conference on Machine Learning, 2017, Sydney, Australia; pp. 1-10.
Bainomugisha et al. (Aug. 2013). "A Survey on Reactive Programming," ACM Computing Surverys 45(4):52:1-52:34.
Barrios et al. (Dec. 2011). "Improving Estimation of Vehicle's Trajectory Using the Latest Global Positioning System with Kalman Filtering," IEEE Transaction on Instrumentation and Measurement 60(12):3747-3755.
Biggio et al. (2015). "One-and-a-half-class Multiple Classifier Systems for Secure Learning against Evasion Attacks at Test Time," International Workshop on Multiple Classifier Systems, 12 pages.
Biggio et al. (Oct. 2010). "Multiple classifier systems for robust classifier design in adversarial environments," Int. J. Mach. Learn. & Cyber 1:27-41.
Biggio et al. (Sep. 2016). "Statistical Meta-Analysis of Presentation Attacks for Secure Multi biometric Systems," IEEE Transactions on Pattern Analysis and Machine Intelligence 39:1-14.
Biggio et al.(2011). "Bagging Classifiers for Fighting Poisoning Attacks in Adversarial Classification Tasks," MCS 2011, LNCS 6713; pp. 350-359.
Binder et al. (1997). "Adaptive Probabilistic Networks with Hidden Variables," Machine Learning 29, 34 pages.
Borio (2017). "A Fresh Look at GNSS Anti-Jamming," Inside GNSS September/October, 12:54-61.
Carpenter et al. (Feb. 1999). "Improved Particle Filter for Nonlinear Problems", IEE Proc-Radar.Sonar Navig.146 (1): 2-7.

Corona et al. (Jul. 2017). "DeltaPhish: Detecting Phishing Webpages in Compromised Websites," European Symposium on Research in Computer Security, pp. 1-16.
Cussens. (2007). "Logic-based Formalisms for Statistical Relational Learning," Introduction to Statistical Relational Learning 16; pp. 1-23.
Czaplicki et al. "Asynchronous Functional Reactive Programming for GUIs," PLDI'13, Jun. 16-19, 2013, Seattle, Washington; pp. 411-422.
Doucet et al. (Dec. 2008). "A Tutorial on Particle Filtering and Smoothing: Fifteen years later," 41 pages.
Fernández-Hernández. "GNSS Authentication: Design Parameters and Service Concepts," Proceedings of the European Navigation Conference, Apr. 2014; pp. 1-18.
Freer et al. (Oct. 2013). "Towards Common-Sense Reasoning Via Conditional Simulation: Legacies of Turning in Artificial Intelligence," Turing's Legacy. Developments from Turing's Ideas in Logic 1212(4799): 1-51.
Gal. "Uncertainty in Deep Learning," PhD thesis, Oct. 2016 University of Cambridge; 166 pages.
Ghahramani (May 2015). "Probabilistic Machine Learning and Artificial Intelligence," Nature 521:1-24.
Gordon et al. "Probabilistic Programming," FOSE'14, May 31-Jun. 7, 2014, Hyderabad, India; pp. 167-181.
Gunning. (Nov. 2017). "Explainable Artificial Intelligence (XAI)," DARPA, pp. 1-36.
Halpern (Dec. 1990). "An Analysis of First-Order Logics of Probability," Artificial Intelligence 46: 311-350.
Ho et al. (Oct. 1964). "A Bayesian Approach to Problems in Stochastic Estimation and Control," IEEE Transactions on Automatic Control 9: 333-339.
Huang et al. "Compiling Markov Chain Monte Cado Algorithms for Probabilistic Modeling," Proceeding of the 38th ACM SIGPLAN Conference on Programming and Language Design and Implementation, 2017, Barcelona, Spain; pp. 1-15.
Humphreys et al. "The Texas Spoofing Test Battery: Toward a Standard for Evaluating GPS Signal Authentication Techniques," 2012 ION GNSS Conference, Sep. 18-21, 2012, Nashville, Tennessee; pp. 1-15.
Kaestner et al. "Generative Object Detection and Tracking in 3D Range Data," 2012 IEEE International Conference on Robotics and Automation, May 14-18, 2012, Saint Paul, Minnesota; pp. 3075-3081.
Kersting et al. (2011). "Statistical Relational AI: Logic, Probability and Computation," Synthesis Lectures on Artificial Intelligence and Machine Learning 10(2):1-38.
Kimmig et al. (2017). "Probabilistic Logic Programs: Unifying Program Trace and Possible World Semantics," 4 pages.
Kolcz et al. "Feature Weighting for Improved Classifier Robustness," CEAS—2009—Sixth Conference on Email and Anti-Spam, Jul. 16-17, 2009, Mountain View, California; pp. 1-8.
Kramer et al. (Jul. 2011). "Robust Small Robot Localization From Highly Uncertain Sensors," IEEE Transactions on Systems, Man, and Cybernetics—Part C: Applications and Reviews 41(4):509-519.
Kulkarni et al. (2015). "Picture: A Probabilistic Programming Language for Scene Perception," Proceedings of the IEEE Conference on Computer Vision and Pattern Recognition; pp. 4390-4399.
Le et al. "Inference Compilation and Universal Probabilistic Programming," Proceedings of the 20th International Conference on Artificial Intelligence and Statistics (AISTATS), 2017, Fort Lauderdale, Florida; pp. 1-11.
Li et al. (Jul. 2014). "The BLOG Language Reference (BLOG version 0.9)," Technical Report, EECS Department, University of California, Berkely; 55 pages.
Li et al. (Jun. 2016). "A Reliable Fusion Methodology for Simultaneous Estimation of Vehicle Sideslip and Yaw Angles," IEEE Transaction on Vehicular Technology 65(6):4440-4458.
Lu et al.(2016). "Repeatability Test Method for GNSS for Safe Train Localisation in Real and Simulated Environments," In Position, Location and Navigation Symposium (PLANS), IEEE, pp. 687-692.
Mansinghka (Jun. 2009). "Natively Probabilistic Computation," 135 pages.

(56) References Cited

OTHER PUBLICATIONS

Mansinghka et al. (Apr. 2014). "Venture: A higher-order probabilistic programming platform with programmable inference," pp. 1-78.
McAllister et al. "Concrete Problems for Autonomous Vehicle Safety: Advantages of Bayesian Deep Learning," Proceedings of the Twenty-Sixth International Joint Conference on Artificial Intelligence, Aug. 19-25, 2017 Melbourne, Australia; pp. 4745-4753.
Medeiros et al. (Apr. 2014). "Multiple-Model Linear Kalman Filter Framework for Unpredictable Signals," IEEE Sensors Journal 14(4):979-991.
Milch (2006). "Probabilistic Models with Unknown Objects," PhD Thesis, University of California, Berkeley; 371 pages.
Milch et al. (2010). "Extending Bayesian Networks to the Open-Universe Case," Heuristics, Probability and Causality: A Tribute to Judea Pearl. College Publications ; 21 pages.
Milch et al. (2005). "Approximate Inference for Infinite Contingent Bayesian Networks," AIStats; 8 pages.
Milch et al. (2007). "BLOG: Relational Modeling with Unknown Objects," Statistical Relational Learning; 7 pages.
Milch et al. (2012). "General Purpose MCMC Inference over Relational Structures," 10 pages.
Molina-Markham (2018), "Probabilistic Models for Assured Position, Navigation, and Timing," The MITRE Corporation. 1 page.
Nurkiewicz et al. (2016). Reactive Programming with RxJava: Creating Asynchronous, Event-Based Applications. N. Barber and B. Foster ed., O'Reilly Media, Inc., 372 pages.
Pearl (Sep. 1986). "Fusion, Propagation, and Structuring in Belief Network," Artificial Intelligence 29:241-288.
Psiaki et al. (Jun. 2016). "GNSS Spoofing and Detection," Proceedings of the IEEE 104(6): 1258-1270.
Rainforth et al. "Interacting Particle Markov Chain Monte Carlo," Proceedings of the 33rd International Conference on Machine Learning, 2016, New York, New York; pp. 1-10.
Ranganath et al. "Black Box Variational Inference," Proceedings of the 17th International Conference on Artificial Intelligence and Statistics (AISTATS) 2014, Reykjavik, Iceland; pp. 814-822.
Russell (Jul. 2015). "Unifying Logic and Probability," Communications of the ACM 58(7):88-97.
Saad et al. (Apr. 2017). "Probabilistic Search for Structured Data via Probabilistic Programming and Nonparametric Bayes," Probabilistic Computing Project, MIT, 14 pages.
Staton et al. "Semantics for probabilistic programming: higher-order functions, continuous distributions, and soft constraints," LICS'16 Jul. 5-8, 2016, New York, New York: 10 pages.
Tolpin et al. (2016). "Design and Implementation of Probabilistic Programming Language Anglican," 12 pages.
Urbina et al (Nov. 2016). "Survey and New Directions for Physics-Based Attack Detection in Control Systems," NIST GCR 16-010; 40 pages.
Wesson et al. "An Evaluation of the Vestigial Signal Defense for Civil GPS Anti-Spoofing," ION GNSS Conference, Sep. 21-23, 2011, Portland, Oregon; pp. 1-11.
Wild et al. (2016). "Robust multimodal face and fingerprint fusion in the presence of spoofing attacks," Pattern Recognition 50:17-25.
Wingate et al. (Jan. 2013). "Automated Variational Inference in Probabilistic Programming," 7 pages.
Wu et al. (Jun. 2016). "Swift: Compiled Inference for Probabilistic Programming Languages," 9 pages.
Wu et al. "Discrete-Continuous Mixtures in Probabilistic Programming: Generalized Semantics and Inference Algorithms," Proceeding of the 35th International Conference on Machine Learning, Jun. 8, 2018, Stockholm, Sweden, 14 pages.
Yang et al. (2016). "Unscented particle filter based Gaussian process regression for IMU/BDS train integrated positioning," 2016 IEEE, pp. 1070-1073.
Zhong et al. (Jan. 2015). "On Designing PMI Kalman Filter for INS/GPS Integrated Systems with Unknown Sensor Error," IEEE Sensors Journal 15(1):535-544.
"Vulnerability Assessment of the Transportation Infrastructure Relying on the Global Positioning System," Final Report, John A. Volpe National Transportation Systems Center, Aug. 29, 2001; 113 pages.

\* cited by examiner

```
type SpoofingSensor;
type ElevationSensor;
type RoadSensor;

origin Timestep Time(SpoofingSensor);
#SpoofingSensor(Time=t) ~ Bernoulli
    (asInfoAvailable);

origin Timestep Time(ElevationSensor);
#ElevationSensor(Time=t) ~ Bernoulli
    (elevationAvailable);

origin Timestep Time(RoadSensor);
#RoadSensor(Time=t) ~ Bernoulli
    (roadInfoAvailable);
```

```
random Boolean Integrity(Timestep t) ~
    case [ASFault(t), ElevationFault(t), RoadFault(t)] in {
        [false, false, false] -> BooleanDistrib(0.99),
        [false, false, true]  -> BooleanDistrib(0.8),
        [false, true,  false] -> BooleanDistrib(0.8),
        [false, true,  true]  -> BooleanDistrib(0.5),
        [true,  false, false] -> BooleanDistrib(0.3),
        [true,  false, true]  -> BooleanDistrib(0.2),
        [true,  true,  false] -> BooleanDistrib(0.2),
        [true,  true,  true]  -> BooleanDistrib(0.01)
    };
```

FIG. 4A

```
random Boolean ElevationFault(Timestep t) ~
if exists ElevationSensor s Time(s) == t then
  if abs(DeviationElevation(t)) > elevation_threshold then
    BooleanDistrib(1-elevation_pfa);
```

```
random Real AuxiliaryElevation(Timestep t) ~
if exists ElevationSensor e Time(e) == t then
  // Assumption related to Pd
  UnivarGaussian(TrueElevation(t), elevation_variance)
else
  // When there are no elevation sensors available,
  // we can only say that the elevation lies in an
  // interval
  UniformReal(-300.0, 600.0);
```

FIG. 4B

SYSTEMS AND METHODS FOR SATELLITE-BASED NAVIGATION

REFERENCE TO RELATED APPLICATIONS

This application claims priority to U.S. Provisional Application Ser. No. 62/658,984 filed Apr. 17, 2018, titled "SYSTEMS AND METHODS FOR SATELLITE-BASED NAVIGATION," which is hereby incorporated by reference in its entirety.

FIELD OF THE INVENTION

This invention relates to systems and methods for position, navigation, and timing, and more specifically to mitigating effects of spoofing on position, velocity, and time estimates.

BACKGROUND OF THE INVENTION

Position, Navigation, and Timing (PNT) platforms provide fundamental support for critical infrastructure, ranging from air traffic control, emergency services, telecom, financial markets, personal navigation, power grids, space applications, etc. PNT platforms provide position, velocity, and time (PVT) estimates by combining measurements from one or more Global Navigation Satellite Systems (GNSS).

Such platforms can be vulnerable to spoofing attacks from an adversarial actor seeking to disrupt the operation of the critical infrastructure. A spoofing attack is a technique used by a hacker or attacker to masquerade or falsify data in a manner that remains undetected by a user. A spoofing attack on a PNT platform involves an attempt by a hacker to trick a GNSS receiver, such as a Global Positioning System (GPS) receiver, by broadcasting a signal which is different than the signals received from GPS satellites. The broadcasted signals are designed to appear as normal or standard GPS signals. However, the spoofed signals are modified in such a manner to cause the GPS receiver to produce invalid time estimates or timing intervals and/or produce a position at a location determined by the attacker, as opposed to the actual UTC time or the receiver's actual location. Thus, the goal of GPS spoofing is to provide a GPS receiver with a misleading signal and, therefore, to deceive the receiver to use fake signals for positioning and timing calculations, resulting in PVT estimates that are not accurate.

In view of the possible presence of adversaries, the reliance on GPS within civil infrastructure is an inherent security vulnerability. Individuals, groups, or nations interested in causing harm can target a GPS-reliant system, thereby disrupting or disabling critical systems, such as vehicles, communications systems, banking and finance institutions and the power grid. Consequently, these systems can be severely compromised when subject to a spoofing attack resulting in positioning or timing anomalies.

SUMMARY OF THE INVENTION

According to some embodiments, a system is configured to generate PVT estimates with measures of assurance that indicate the degree to which the PVT estimate meets an operational requirement such as integrity, which is a measure of whether a PVT estimate is affected by adversarial action such as GPS satellite spoofing. PVT estimators with assurance may use open-universe probability models (OUPMs) to generate PVT estimate assurance metrics and/or PVT estimators suitable for adversarial environments in which information used by the platform for PVT estimation is uncertain in terms of both availability and reliability.

According to some embodiments, a mobile system includes one or more antennas and one or more receivers for receiving global navigation satellite (GNSS) signals, one or more processors, memory, and one or more programs, wherein the one or more programs are stored in the memory and configured to be executed by the one or more processors, the one or more programs including instructions for generating a plurality of position estimates based on at least pseudo-distances determined from at least some of the GNSS signals, wherein each position estimate is generated based on a different set of pseudo-distances, determining an inconsistency in one or more of the position estimates based on verification information, generating a trust assessment for each position estimate based on determined inconsistencies, outputting a position estimate associated with a highest trust assessment as a position of the mobile system, and reducing an influence of a GNSS signal on a future position estimate generation based on a lower trust assessment for position estimates generated based on the GNSS signal.

In any of these embodiments, generating the plurality of position estimates may be based partially on inertial measurements from one or more inertial measurement units.

In any of these embodiments, determining an inconsistency may include comparing at least a portion of a position estimate with an expectation about the position estimate that is derived from the verification information.

In any of these embodiments, the verification information may include predetermined information associated with global positions.

In any of these embodiments, the verification information may include information from one or more sensors on the mobile system.

In any of these embodiments, at least two inconsistency tests may be applied to each position estimate to determine inconsistencies, the trust assessment for each position estimate may be based on the at least two inconsistency tests, and the at least two inconsistency tests may have different degrees of influence on the trust assessment.

In any of these embodiments, the trust assessments may be generated using an open-universe probability model.

In any of these embodiments, the trust assessment may be a probability that the position estimate satisfies at least one of integrity, availability, and continuity.

In any of these embodiments, the one or more programs may include instructions for applying a GNSS signal spoof detector to detect a spoofed GNSS signal, wherein trust assessments for position estimates that are based on the spoofed GNSS signal are generated based on a trust value associated with the GNSS signal spoof detector.

According to some embodiments, a method for determining position of a mobile system includes receiving GNSS signals by a receiver of the mobile system, generating a plurality of position estimates based on at least pseudo-distances determined from at least some of the GNSS signals, wherein each position estimate is generated based on a different set of pseudo-distances, determining an inconsistency in one or more of the position estimates based on verification information, generating a trust assessment for each position estimate based on determined inconsistencies, outputting a position estimate associated with a higher trust assessment as a position of the mobile system, and reducing an influence of a GNSS signal on a future position estimate generation based on a lower trust assessment for position estimates generated based on the GNSS signal.

In any of these embodiments, generating the plurality of position estimates may be based partially on inertial measurements from one or more inertial measurement units.

In any of these embodiments, determining an inconsistency may include comparing at least a portion of a position estimate with an expectation about the position estimate that is derived from the verification information.

In any of these embodiments, the verification information may include predetermined information associated with global positions.

In any of these embodiments, the verification information may include information from one or more sensors on the mobile system.

In any of these embodiments, at least two inconsistency tests may be applied to each position estimate to determine inconsistencies, the trust assessment for each position estimate may be based on the at least two inconsistency tests, and the at least two inconsistency tests may have different degrees of influence on the trust assessment.

In any of these embodiments, the trust assessments may be generated using an open-universe probability model.

In any of these embodiments, the trust assessment may be a probability that the position estimate satisfies at least one of integrity, availability, and continuity.

In any of these embodiments, the method may include applying a GNSS signal spoof detector to detect a spoofed GNSS signal, wherein trust assessments for position estimates that are based on the spoofed GNSS signal are generated based on a trust value associated with the GNSS signal spoof detector.

According to some embodiments, a non-transitory computer readable storage medium includes one or more programs, which when executed by one or more processors of a mobile system, cause the one or more processors to perform a method that includes generating a plurality of position estimates based on at least pseudo-distances determined from at least some global navigation satellite (GNSS) signals received by a receiver of the mobile system, wherein each position estimate is generated based on a different set of pseudo-distances, determining an inconsistency in one or more of the position estimates based on verification information, generating a trust assessment for each position estimate based on determined inconsistencies, outputting a position estimate associated with a higher trust assessment as a position of the mobile system, and reducing an influence of a GNSS signal on a future position estimate generation based on a lower trust assessment for position estimates generated based on the GNSS signal.

In any of these embodiments, generating the plurality of position estimates may be based partially on inertial measurements from one or more inertial measurement units.

In any of these embodiments, determining an inconsistency may include comparing at least a portion of a position estimate with an expectation about the position estimate that is derived from the verification information.

In any of these embodiments, the verification information may include predetermined information associated with global positions.

In any of these embodiments, the verification information may include information from one or more sensors on the mobile system.

In any of these embodiments, at least two inconsistency tests may be applied to each position estimate to determine inconsistencies, the trust assessment for each position estimate may be based on the at least two inconsistency tests, and the at least two inconsistency tests may have different degrees of influence on the trust assessment.

In any of these embodiments, the trust assessments may be generated using an open-universe probability model.

In any of these embodiments, the trust assessment may be a probability that the position estimate satisfies at least one of integrity, availability, and continuity.

In any of these embodiments, the method may include applying a GNSS signal spoof detector to detect a spoofed GNSS signal, wherein trust assessments for position estimates that are based on the spoofed GNSS signal are generated based on a trust value associated with the GNSS signal spoof detector.

BRIEF DESCRIPTION OF THE DRAWINGS

FIGS. 4A-4B illustrate the probabilistic model (OUPM) of FIG. 3 implemented as a probabilistic program;

DETAILED DESCRIPTION OF EXEMPLARY EMBODIMENTS

Figure 1:
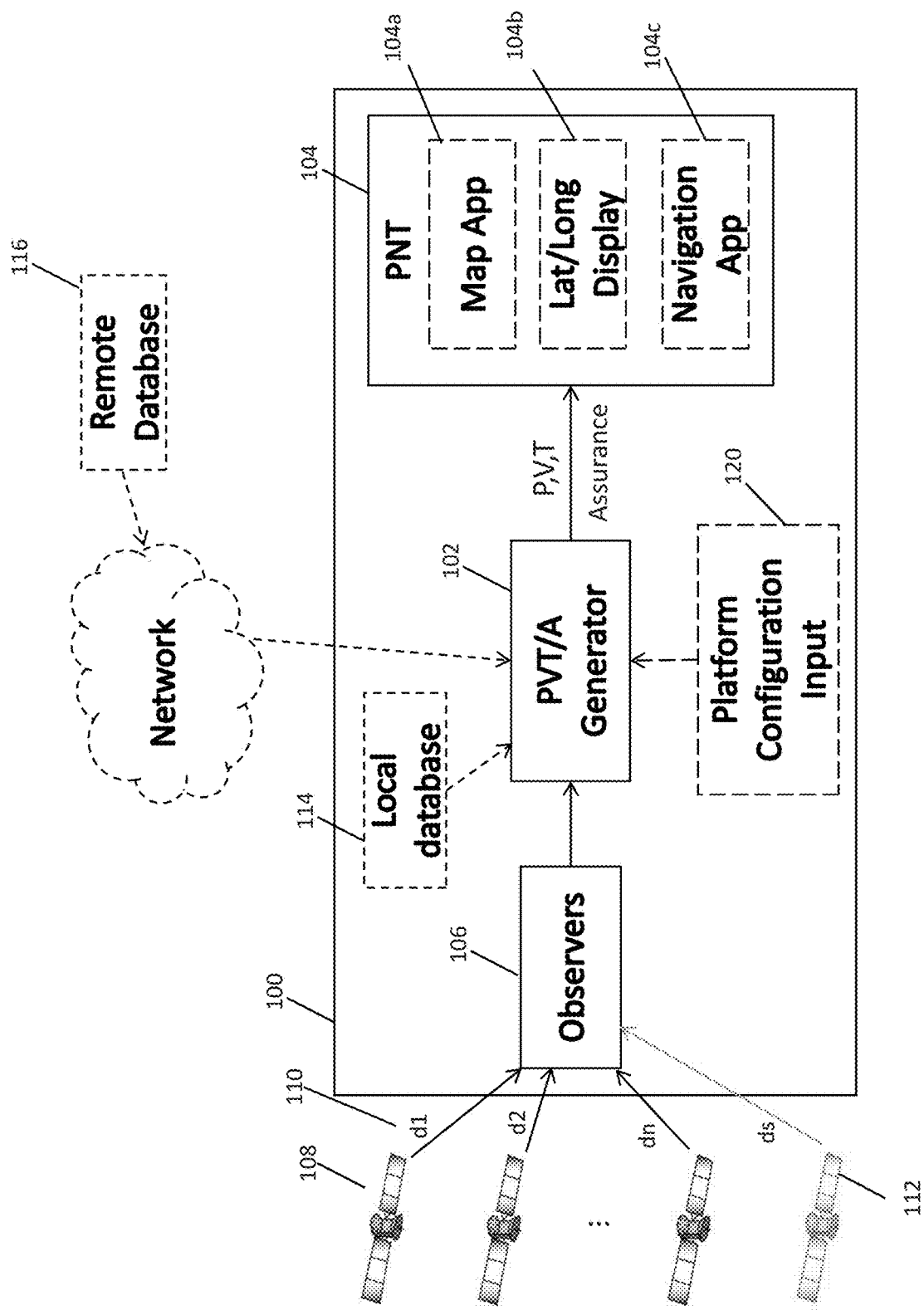
FIG. 1 is a block diagram illustrating a mobile system, according to an embodiment.

Disclosed herein are systems and methods for generating PVT estimates with measures of assurance. The measures of assurance indicate the degree to which the PVT estimate meets operational requirements. For example, an assurance measure provided according to some embodiments can indicate the probability that a PVT estimate is accurate. PVT estimators, according to some embodiments, can return not only an estimate (e.g., of position), but also assurance assessments that can inform a user how much a PVT estimate can be trusted.

According to some embodiments, a PVT estimator with assurance is built on a probabilistic engine that encodes uncertainty about which objects exist (or may be present), and uncertainty about the relations among these objects. This observation is critical because in adversarial environments uncertainty about the availability, continuity, and integrity of a PVT solution can arise from noise or incomplete information. According to some embodiments, PVT estimators with assurance use open-universe probability models to generate PVT estimate assurance metrics and/or PVT estimates suitable for adversarial environments in which the information available to the platform implementing the PVT estimator is uncertain. OUPMs have richer semantics than other commonly used probabilistic models such as Bayesian networks and allow the modeling of structural uncertainty that corresponds to the uncertain availability of sensors, such as satellites, inertial sensors, clocks, etc., and the uncertain presence of one or more adversaries. Additionally, OUPMs, according to some embodiments, model relational uncertainty, such as how adversaries influence observations about the state of the system implementing the platform. The associated probabilistic programs, in addition to encoding trust and adversarial models, can specify assurance requirements (e.g., related to accuracy, availability, and continuity).

In the following description of the disclosure and embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates a system 100 that uses PVT estimates with assurance to provide improved position, navigation, and/or timing, according to some embodiments. System 100 may be a mobile platform, such as a vehicle, aircraft, ship, handheld device, etc., or may be a component of such platform. System 100 may generate PVT estimates with assurance for its own positioning, navigating, or timing, or may provide position, navigation, and timing information to a connected component or system or to a user. For example, system 100 may be an autonomous device, such as a drone, and may generate PVT estimates with assurance for improving its own autonomous navigation. In some embodiments, system 100 is a dedicated handheld GPS device that provides position information to a user, such as on a display of system 100, and in other embodiments, system 100 is a general purpose mobile device, such as a smartphone, with PNT capability.

System 100 includes a PVT estimate generator 102 that includes assurance metrics for improving PVT estimates and/or providing measures of assurance to users or connected systems. PVT estimate generator 102 generates PVT estimates and provides the PVT estimates to a PNT application 104. Examples of PNT applications may include a mapping application 104a that may show the position of the system 100 on a map. For example, system 100 may be a smartphone and the PVT estimates may be provided to a map application running on the smartphone for displaying position to the user of the smartphone. In some embodiments, the PVT estimates are simply output for display 104b, such as to a user. For example, system 100 may be a dedicated GPS unit that may display latitude and longitude on a display of the system 100 for a user. An assurance metric may also be shown on the display, for example, along with latitude and longitude in order to inform a user about the trustworthiness of the estimate. In some embodiments, the PVT estimates are provided to a navigation application 104c that may use the PVT estimates to provide navigation control commands. For example, system 100 may be an autonomous apparatus or a component of an autonomous apparatus, and the navigation application 104c may control the movement of the apparatus based on the PVT estimates.

System 100 may include one or more observers 106. An "observer" may be any component that provides an observation about the environment of system 100. For example, observers 106 can include one or more GPS receivers that receive signals from GPS satellites 108 via one or more antennas and decode the signals to determine pseudo-distances 110 to the satellites. Observers 106 can include an inertial measurement unit (IMU) that provides measurements of system acceleration, such as angular and linear acceleration, and/or estimations of whether the platform is moving or stationary. Observers 106 can include a clock for determining local timing, an altimeter, a range finder, or any other component or module that can make observations about the state of the system 100 with its environment. PVT estimate generator 102 generates PVT estimates based at least in part on observations provided by one or more observers 106. For example, PVT estimate generator may generate PVT estimates based on observations derived from GPS signals received by observers 106, by observations derived from cellular communication signals received from cellular towers, by observations derived from Wide Area Networks (WAN) or Local Area Networks (LAN), by observations derived from measurements of an IMU, or by any other observations or combinations of these observations that may inform a PVT estimate.

Observers 106 may be susceptible to adversary influence such that at least some of the information provided by observers 106 is unreliable. For example, an adversary may generate one or more spoofed GPS satellite signals 112 in order to induce errors in the position, navigation, and/or timing of system 100. Additionally, observers 106 may generate erroneous information (i.e., measurements) due to internal faults, noise, biases, environmental factors, etc. As described further below, the PVT estimate generator models inaccuracies and trustworthiness of sensors to measure trust in PVT estimates and to improve PVT estimation.

The observations generated by observers 106 are provided to PVT estimate generator 102 for generating estimates of PVT and for generating measures of assurance for PVT estimates. One or more types of information generated by observers 106 may be used in PVT estimate calculations while other types of information may be used to verify PVT estimates. For example, pseudo-distances 110 provided to the PVT estimate generator 102 by a GPS receiver may be used directly in a PVT calculation, whereas a measure of whether system 100 is moving or stationary, as determined by an IMU, may be used to check whether a PVT estimate indicates movement by providing a different position than an earlier estimate.

PVT estimate generator 102 may be connected to a local database 114 and/or a remote database 116, which can store pre-known information that can be used to evaluate the accuracy of PVT estimates. For example, the local and/or remote database can include a table of known latitude, longitude, and altitude values that can be used to verify the latitude/longitude/altitude estimates of the PVT estimate generator. If, for example, the PVT estimate does not match the information in the database, then the trust in the PVT estimate may be reduced by the PVT estimate generator. Another example of information that may be stored in the local 114 and/or remote 116 databases is road information, for example, as used by a mapping application. The road information can indicated whether a particular latitude/longitude is expected to be on-road or off-road. A check of the road information for a PVT estimate may indicate off-road, whereas an observer 106 may generate a measure that indicates on-road and this conflict may result in the PVT estimate generator 102 reducing the trust in the PVT estimate.

System 100 may also include a platform configuration input 120. The platform configuration input 120 may be used to set one or more parameters of the PVT estimate generator 102. For example, a user may be most interested in ensuring the integrity of the PVT estimate and may select integrity as being the basis for the assurances determined by the PVT estimate generator 102.

Figure 2:
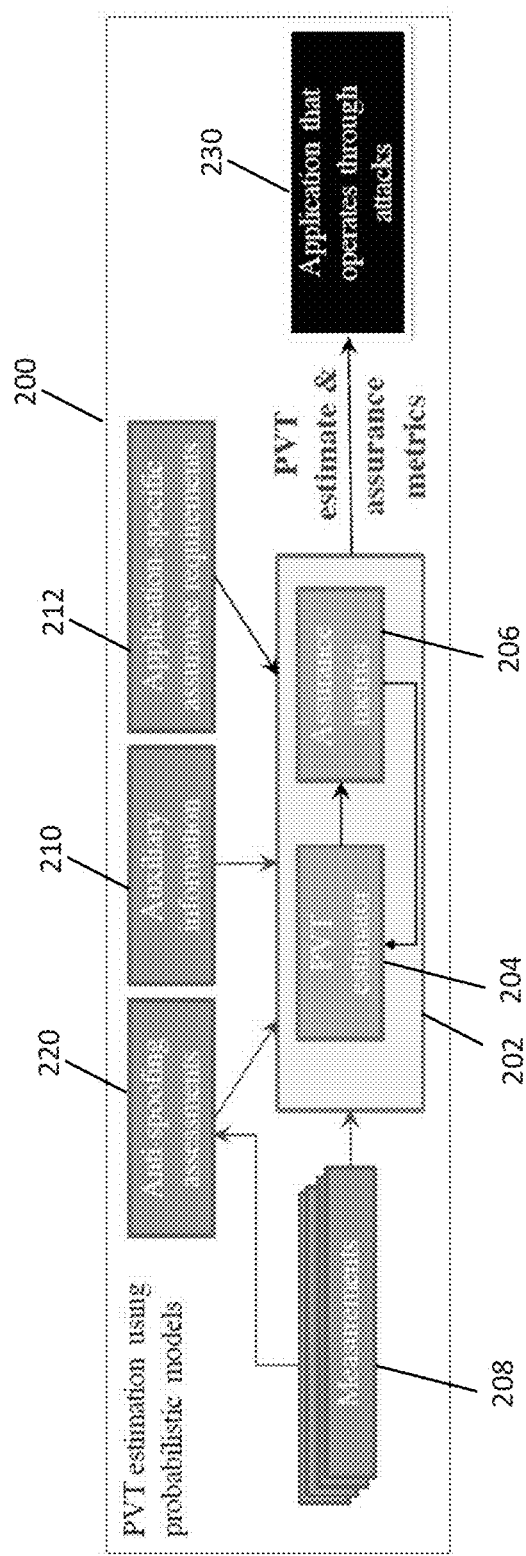
FIG. 2 is a functional block diagram illustrating a PVT estimate generator using anti-spoofing assessments, according to an embodiment.

A block diagram of a PVT estimate generator 200, according to some embodiments, is provided in FIG. 2. The PVT estimate generator 200 has a PVT engine 202 that provides PVT estimates with assurance metrics. PVT engine 202 generates PVT estimates with assurance metrics and outputs the PVT estimates and assurance metrics to one or more applications 230. These applications can "operate through attacks" because the PVT estimates provided by the PVT engine 202 are augmented based on assurance metrics that can reduce the influence of unreliable (e.g., spoofed) observations on PVT estimates.

PVT engine 202 includes PVT estimation module 204 and an assurance metric module 206. The PVT estimation module 204 generates PVT estimates based on a plurality of observations 208 (also referred to herein as measurements). The PVT estimates may be provided to the assurance metric module 206 for calculation of assurance metrics for the PVT estimates. Assurance metrics may be fed back into the PVT estimation module 204 for modifying how the estimates are generated.

The observations 208 can be measurements related to the state of the system on which PVT estimate generator 200 is implemented. For example, for system 100 of FIG. 1, the observations may be provided by one or more observers 106. Observations 208 may include pseudo-distances associated with GPS satellites, one or more outputs from an IMU, timing from a clock, output of a speed sensor of a vehicle, or any other measurement that may be relevant to generating and/or verifying a PVT estimate.

PVT estimate generator 200 can include one or more anti-spoofing modules 220. The anti-spoofing modules 220 can apply one or more anti-spoofing techniques to one or more observations 208 to detect a spoofed signal, which can be thought of as detecting inconsistencies in the observations 208 that suggest a spoofed signal. For example, an anti-spoofing module 220 may analyze information decoded from a GPS signal to determine whether the signal is not authentic because, for example, it is inconsistent with what would be expected from an authentic signal. Examples of monitors for anti-spoofing assessments include position monitors, velocity monitors, code-carrier divergence (CCD) monitors, and clock rate monitors.

The output of an anti-spoofing module 220 may be a binary statement, such as that a given measurement is associated with a spoofed signal or may be a numerical estimation of a likelihood of spoofing. The results of the anti-spoofing evaluations of the anti-spoofing module 220 may be provided to the PVT estimation module 204, which can alter a PVT estimate in a future iteration, and can be provided to an assurance metric module 206 for generating an assurance assessment for a PVT estimate.

PVT engine 202 may use auxiliary information 210 in generating PVT estimates with assurance. Auxiliary information 210 may include predetermined information that may be used to assess the accuracy of PVT estimates. For example, in system 100, auxiliary information 210 may be stored in local database 114. The auxiliary information 210 can, for example, include information regarding whether or not the system (e.g. system 100) is moving or stationary, above ground or below ground, and/or is on road or off road. Application-specific assurance requirements 212 may be used to tune PVT engine 202 to a desired application. For system 100, for example, these setting may be set by platform configuration input 120. Application-specific requirements 212 can include information that is specific for an application or geared towards a specific mission. For example, a mission may have application-specific requirements 212 that include that the PVT estimate needs to be generated from inputs that have not been spoofed and the PVT estimate may be generated in such a way that the possibly spoofed inputs are eliminated even at the cost of availability of a PVT estimate. Similarly, application-specific requirements 212 can prioritize accuracy over availability or vice versa. For example, if PVT estimates are used to quickly generate a heat map to pinpoint a location and the heat map has a large radius, then an assessment of trust in the estimate that is based on an application-specific requirement that says that accuracy is paramount may indicate a low level of trust due to the large radius—i.e., low accuracy. However, if the application-specific requirements 212 prioritize availability over accuracy, then the assessment of trust may be high due to the quick generation of the heat map.

According to some embodiments, PVT engine 202 uses an OUPM to generate PVT estimates and PVT assurance metrics that are suitable for environments in which the information available to the PVT estimate generator 200 is uncertain. OUPMs model objects and relations between objects. Objects may be sensors, satellites, vehicles, roads, etc. Relations describe how these objects may influence the measurements of specific sensors (e.g., how the motion of a vehicle affects the measurements used to estimate its position). PVT engine 202 may model uncertainty about which objects exist (or may be present) and uncertainty about the relations among these objects. Uncertainty may be due to, for example, adversary action, such as a spoofed signal, or may be due to sensor noise, sensor faults, etc.

Adversaries affecting PVT estimates can also be modeled as objects that influence other objects, including sensors, such as by affecting the availability and measurements of the sensors. According to some embodiments, the behavior of adversaries can be modeled with high accuracy based upon prior knowledge of adversary behavior. For example, some spoofing techniques are well known and, thus, an adversary applying a well-known spoofing technique can be modeled accurately. However, adversaries with more uncertain behavior can also be modeled within the PVT engine 202 using OUPMs.

As stated above, PVT engine 202 includes PVT estimation module 204 and assurance metric module 206. PVT assurance metric module 206 can generate measures of confidence in beliefs about the availability, continuity, and integrity of a PVT estimation. Because these beliefs depend on the underlying models, accurately measuring PVT assurance requires adequate quantification of model uncertainty. Uncertainty about the availability, continuity, and integrity of a PVT solution can arise from noise, incomplete information, and adversary action.

According to some embodiments, beliefs in the integrity of a PVT estimate can be informed by anti-spoofing techniques, such as provided by anti-spoofing modules 220. For example, the trust in the integrity of a PVT estimate could be reduced in the event that a spoofed signal used to generate the PVT estimate is used. The beliefs in the integrity of a PVT estimate can also be informed by various kinds of additional information, such as auxiliary information 210 (also referred to herein as verification information). The following examples of ground elevation information and road information illustrate how auxiliary information can be used in generating PVT assurance metrics, according to some embodiments.

Ground elevation information gives PVT estimate generator 200 an estimate of the expected ground elevation for a given latitude and longitude. Thus, if the system implementing PVT estimate generator 200 (e.g., system 100 of FIG. 1) is known to be at ground level and the elevation in the PVT estimate is inconsistent with being at ground level, then the trust in the integrity of the PVT can be reduced.

Road information provides the receiver with the closest point on a road, given a latitude-longitude pair. Therefore, if the system is known to be on the road, but the road information returns the coordinates of a point that is inconsistent with being on the road—e.g., that is not sufficiently close to a road, the trust in the integrity of the PVT can be reduced. These two types of auxiliary information can be modeled in the PVT engine 202 to generate assurance metrics.

OUPMs implemented in PVT engines, according to some embodiments, provide a powerful language to represent statements about objects and to rigorously reason about the uncertainty of such statements. In a first-order logic L, L-structures consist of a set (of objects), together with a set of functions and relations. Functions and predicate symbols have corresponding functions and relations on the set (of objects). These L-structures are referred to as possible worlds. In this context, a logic formula (an L-formula) is true in a given L-structure (world) if the formula is true according to first-order logic semantics. For example, the formula isaccurate(mysensor) is true in an L-structure if and only if the object that the symbol mysensor represents is an element of the set characterized by the predicate symbol isaccurate. To reason about the probability that these statements are true, a probability distribution over L-structures (possible worlds) can be used, such that the probability of a statement isaccurate(mysensor) has a specific value.

According to some embodiments, an OUPM implemented in a PVT engine specifies a unique probability distribution over all possible worlds of modeled objects and relations. The OUPM enables queries that can generate the probability that a particular object exists, or more generally, the probability that a particular statement is true. Queries are functions on logic and numeric expressions that involve constant and random terms. Thus, a query can encode inference tasks concerning the estimation of posterior probabilities that a particular assurance requirement is satisfied, given a set of observations. Queries within an OUPM can be used to define assurance metrics. For example, the probabilities of accuracy, availability, continuity, and accuracy—assurances—of a PVT solution can be estimated based on a set of observations and a model using one or more queries within an OUPM.

The accuracy of a solution can be defined as the probability that the solution is within a specific boundary of the truth value that is estimated. Availability is defined as the probability that a receiver will be able to compute a useful solution when needed during a specified interval of time (e.g., the next hour, or the expected duration of a trip). Continuity is defined as the probability that a solution can be continuously updated during a period of time. Integrity is defined as the ability to obtain a PVT solution that has not been manipulated by an adversary.

Thus, assurance queries may be related to, for example, model consistency. Queries can be generated that test the extent to which facts that should be true are indeed true. For example, if inputs are assumed to be drawn from a specific distribution, the extent to which observations match that assumption can be queried. If an availability of a specific number of satellites is expected, the probability that the observations match this expectation can be queried. Similarly, the extent to which a PVT solution using, say, 8 out of 10 available satellites is close to a solution using all 10 satellites can be queried.

Assurance queries can also be related to the desirability of the most probable world. The possible worlds semantics of OUPMs allows reasoning about the properties of the most probable world. These properties may correspond to disruptions or disorder. This may be particularly useful when there are multiple sources to estimate the same value. Thus, for example, when observations correspond to a world where there is significant disagreement among sources, a low assurance may be computed. Conflict between objects may be quantified and these quantities can be used to reason about assurance. Answers to queries can be transformed into numerical measures of confidence that PVT solutions satisfy a set of properties.

The answers to assurance queries can also be fed to a PVT estimator that takes assurance metrics into account to update how different sources of information should influence the PVT solution. According to some embodiments, PVT estimation module 204 uses inputs—e.g., observations 208—with varying degrees of trust and availability. The trust in an input may vary over time, depending on the influence of the sources on prior solutions. For example, some sophisticated adversarial attacks may be able to steer a PVT solution by spoofing signals with plausible consistency such that the attack may not be detected, but the trust in the spoofed signals may be reduced because the PVT solution generated from the spoofed signal may produce low assurance measures. Thus, in PVT estimation module 204, signals from a presumed satellite may contribute to the solution according to the belief, over time, that the signals are pristine.

According to some embodiments, a PVT estimator that accounts for beliefs about the trust of signals over time includes an adaptive weighted least squares (AWLS) model that estimates PVT from a plurality of pseudo-ranges derived from signals received from a plurality of GPS satellites while factoring assurance metrics for the pseudo-ranges. The adaptive weighted least squares can be used to estimate PVT while reducing the influence of observations that have higher leverage on a PVT estimate.

Conventionally, a weighted least squares PVT estimator estimates position $(x_1, x_2, x_3)$ in earth-centered, earth-fixed (ECEF) coordinates from N satellite signals using the pseudo-ranges between the receiver and each of the N satellites, which defines a linear system of equations related to $x_1$, $x_2$, $x_3$, $b$, where b is a clock bias. Weighted least squares can be used to compute an update $(\Delta x_1, \Delta x_2, \Delta x_a, \Delta b)$ to compute a new estimated position and clock bias. Let, $$p^{(j)} = \sqrt{(x_1^{(j)}-x_1)^2 + (x_2^{(j)}-x_2)^2 + (x_3^{(j)}-x_3)^2},$$

where $(x_1^{(j)}, x_2^{(j)}, x_3^{(j)})$ is the position of the j-th satellite. Then the pseudo-range of the j-th transmitter is $$\rho^{(j)} = \hat{\rho}^{(j)} - \frac{x_1^{(j)} - \hat{x}_1}{\hat{\rho}^{(j)}} \Delta x_1 - \frac{x_2^{(j)} - \hat{x}_2}{\hat{\rho}^{(j)}} \Delta x_2 - \frac{x_3^{(j)} - \hat{x}_3}{\hat{\rho}^{(j)}} \Delta x_3 + c\Delta b,$$

where c denotes the speed of light constant. Then, $\Delta p^{(j)} = \hat{\rho}^{(j)} - p^{(j)}$ can be expressed as $$a_1^{(j)} \Delta x_1 + a_2^{(j)} \Delta x_2 + a_3^{(j)} \Delta x_3 - c\Delta b.$$

Therefore, $$\begin{bmatrix} \Delta \rho^{(1)} \\ \Delta \rho^{(2)} \\ \vdots \\ \Delta \rho^{(N)} \end{bmatrix} = \begin{bmatrix} a_1^{(1)} & a_2^{(1)} & a_3^{(1)} & 1 \\ a_1^{(2)} & a_2^{(2)} & a_3^{(2)} & 1 \\ \vdots & \vdots & \vdots & \vdots \\ a_1^{(N)} & a_2^{(N)} & a_3^{(N)} & 1 \end{bmatrix} \begin{bmatrix} \Delta x_1 \\ \Delta x_2 \\ \Delta x_3 \\ -c\Delta b \end{bmatrix}$$

This system of equations can be efficiently solved when N is greater than or equal to four. When the system is over-constrained, a solution can be estimated using least squares such that the sum of squares of the estimated residuals is minimized. Furthermore, the variance of each observation can be used to weigh the influence of the observation on the solution. That is, if $Ax=v$ describes a linear system of equations, where A is an m×n matrix, then $$x_{WLS} = (A^H W^{-1} A)^{-1} A^H W^{-1} v$$

minimizes the weighted mean-squared error in an over-constrained system, where W is a weight invertible matrix.

Linear estimators, such as weighted least squares, however, are susceptible to radical changes in solutions by excluding or including a single point with high leverage. For a linear regression, the leverage of a point i in a collection of n points is given by:

$$h^{(i)} = \frac{1}{n} + \frac{(x^{(i)} - \bar{x})^2}{\sum_{j=1}^{n} (x^{(j)} - \bar{x})^2}$$

It is possible to eliminate points with high leverage. However, sophisticated adversaries that inject false observations may still attempt to bias a solution by introducing points with the highest leverage that is undetected. Some adversaries may have the broad target of decreasing the accuracy of a solution. However, other adversaries may have a specific goal of deviating the solution in a certain direction.

AWLS, as implemented in PVT estimators of some embodiments, takes into account measures of trust to update trust beliefs in inputs. The PVT estimator adjusts the influence of various inputs according to these trust beliefs. The AWLS algorithm reduces the influence of information sources that would result in a solution with lower measures of trust. For example, the PVT estimator may reduce the influence of information sources that: 1) have abnormally high leverage; or 2) induce solutions with lower assurance metrics (e.g., because the solutions conflict with auxiliary information).

The first consideration—abnormally high leverage—is a particular instance of a more general principle related to the ability of encoding rationale that can be used to lower the trust in data without the help of additional information. For example, it is easy to see that in the case of a linear regression, the leverage $h^{(i)}$ is between 1/n and 1, and increases with the distance from $x^{(i)}$ to x. Thus, points that have leverage larger than the average leverage could be points produced by an adversary. This type of statistical condition can be modeled in the OUPM, according to some embodiments, to lower the trust in input sources.

The second consideration above relates to the general principle of leveraging auxiliary information to maintain our trust assumptions about the sources of a PVT solution. Additional information may include, for example, simple facts, such as that the system (e.g., system 100 of FIG. 1) is not moving or that it is at sea level. However, additional information can also come from additional sensors (a clock or IMU), or additional sources (such as the elevation or road information described above). Thus, assurance measurements can feed back into the calculation of a new PVT solution, affecting how the sources get combined in computations of future PVT estimates.

Figure 3:
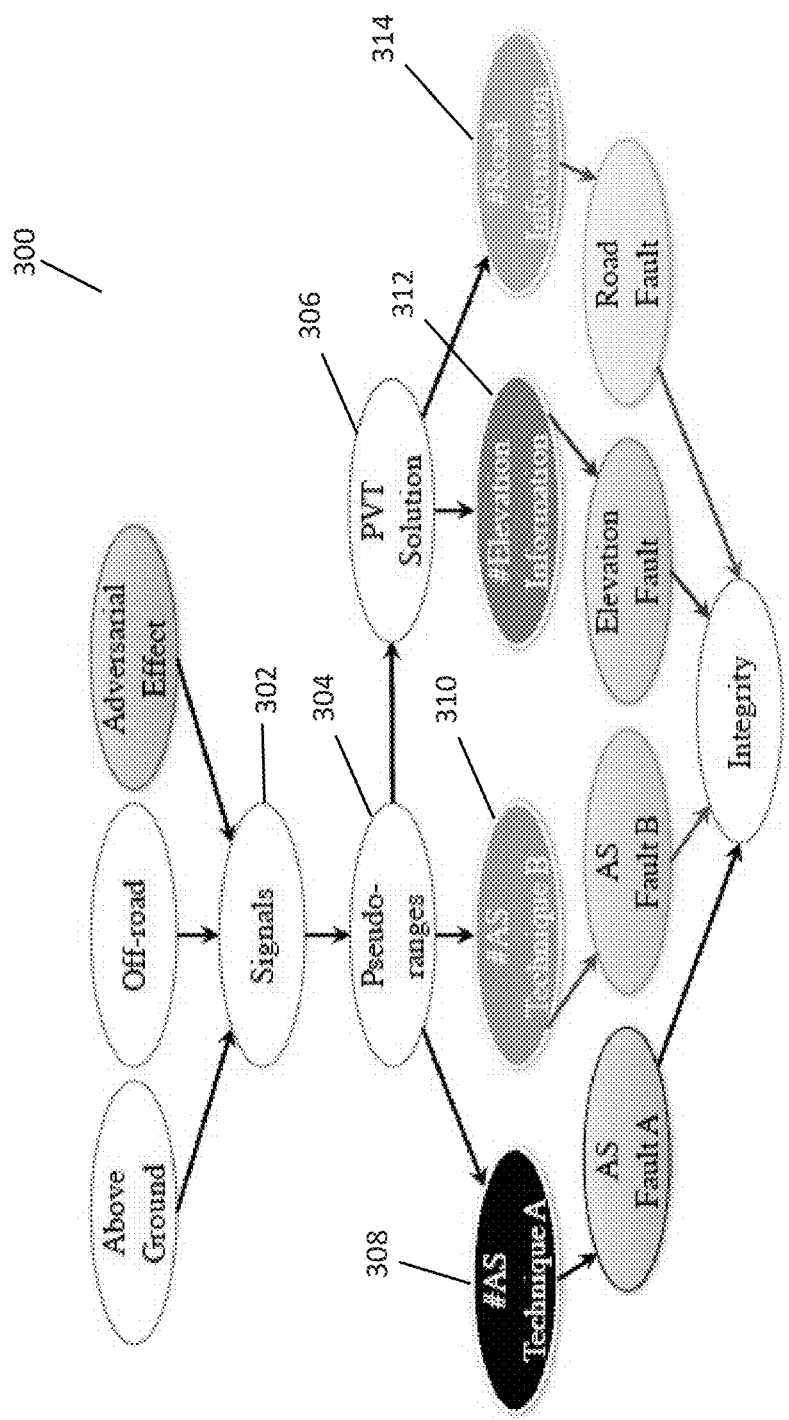
FIG. 3 illustrates a probabilistic model for measuring assurance of PVT estimates, according to one embodiment.

FIG. 3 illustrates how anti-spoofing techniques and auxiliary information can be used in a probabilistic model to measure assurance—i.e., to evaluate a desired property of a PVT solution (integrity in this case)—generated from a plurality of GPS signals, according to one exemplary embodiment. Assurance model 300 can be implemented in a PVT estimate generator, such as PVT estimate generator 200 of FIG. 2.

In assurance model 300, signals 302 represents a plurality of GPS signals received by the system implementing assurance model 300. To varying degrees and at varying times, in the world represented in assurance model 300, these signals can be affected by how far above ground the system is, where the system is with respect to roads, and the actions of adversaries. A plurality of pseudo-range (also referred to herein as pseudo-distance) observations 304 are generated based on the signals 302. The pseudo-range observations 304 are used to generate a PVT solution 306 and can also be used by anti-spoofing modules to detect a spoofed signal. The anti-spoofing modules can be characterized as determining one or more inconsistencies between a PVT solution and verification information, as discussed further below.

Assurance model 300 includes a case in which two anti-spoofing techniques are applied to pseudo-ranges. These two anti-spoofing techniques can be thought of as inconsistency tests that are applied to determine whether there are any inconsistencies in a PVT solution(s) and/or the various information used to generate the PVT solution(s). Anti-spoofing monitor 308 uses one type of anti-spoofing algorithm and anti-spoofing monitor 310 uses another type of anti-spoofing algorithm. Assurance model 300 also includes the two additional sources of information described above—elevation information 312 and road information 314.

In this model, each pseudo-range observation 304 is labeled as spoofed or not spoofed, depending on whether or not the observations exhibit features—i.e., inconsistencies—that can be detected by one or more of the anti-spoofing monitors 308 and 310. The outputs from each of the monitors can be categorical (e.g., true/false) or can be numerical.

The elevation information 312 can be obtained, for example, using the Google Maps Elevation API or any other mapping source or service that can provided elevation information latitude/longitude locations. Thus, for each PVT solution 306, the elevation of a ground point with a corresponding latitude and longitude is obtained and the difference between this elevation and the one in the corresponding PVT solution is computed. Inconsistency between the PVT-based elevation and the map-based elevation can indicate one or more spoofed or otherwise unreliable signals.

The road information 314 can be obtained, for example, using the Google Maps Roads API. For each PVT solution 306, the latitude and longitude of the closest point on the road from the point in the solution is obtained and then the distance between this road point and the point in the solution is determined. When a PVT estimate generator is on a vehicle traveling on the road, this distance should be small, whereas it may be large when a vehicle leaves the road. An inconsistency between what is expected (e.g., if the vehicle is known to be on a road) and what the PVT solution suggests can indicate one or more spoofed or otherwise unreliable signals.

These three pieces of information are considered in the assurance model 300 with uncertain availability. To model the uncertain availability of information, number variables are used. Each corresponding object will exist in a world with a specified probability, for example, by using a BLOG (a probabilistic programming language that can be used to describe OUPMs) declaration such as provided in FIG. 4A in which the anti-spoofing monitors 308 and 310 are modeled with the number variable SpoofingSensor, the elevation information 312 is modeled with the number variable ElevationSensor, and road information 314 is modeled with the number variable RoadSensor. The availability of these sensors can vary over time, which can be expressed using origin statements in the BLOG syntax.

The manner in which the information from these sensors results in faults can be defined in BLOG is shown in FIG. 4B. How these faults are combined into a measure of integrity is shown in FIG. 4A. These two kinds of statements relate to how much each piece of information is trusted, as well as the independence assumptions about the information from these sensors. As illustrated in FIG. 4A, the anti-spoofing fault in this example has a greater influence on the measure of integrity than the elevation and road faults, since the integrity of cases in which there is a spoofing fault (ASFault(t) is "true") have a Boolean distribution with a mean no higher than 0.3. This means that the anti-spoofing detector is more trusted in terms of indicating the integrity of a PVT estimate than the other verification methods in the example. Execution of assurance model 300 results in a measure of probability that the PVT solution (e.g., at a given time step) is not influenced by a spoofed signal.

Thus, different methods for verifying PVT estimates, such as GNSS signal spoof detectors implemented by anti-spoofing monitors and algorithms leveraging additional sources of information described above for detecting inconsistencies in PVT estimates, such as elevation information 312 and road information 314, can be combined for generating trust assessments for PVT estimates. The various verification methods can be combined by defining probability distributions associated with a given combination of verification scenarios (e.g., each Boolean distribution in FIG. 4A) in which the influence of each method on the probability distribution reflects a level of trust in the given method. For example, as explained above, the anti-spoofing fault detector of FIG. 4A has a higher level of trust in terms of the correctness of its result than the elevation fault and road fault.

The measure of integrity from assurance model 300 can be used in an adaptive PVT estimator to improve the PVT solution. In the AWLS estimator discussed above, the influence of a measurement source can be weighted according to a most recent trust assessment. For the case modeled in assurance model 300, given a sufficiently large number of satellites, ignoring a single satellite should not result in dramatically different solutions. A solution that is closest to the previous solution and that, for example, is also on the road is the solution that is least affected (or not affected at all) by a spoofed satellite signal. Therefore, measurements used to generate solutions that are closest to one another, closest to previously generated solutions, and/or agree with verification information, such as whether the platform is expected to be on the road or not can be assigned higher weights than measurements that greatly skew the solution. In other words, since the leverage of a spoofed satellite on the solution will be abnormally high, an adaptive PVT estimator can detect that leverage and reduce the trust in the measurement generated from the spoofed satellite signal, for example, by changing the weighting in a weighted least square PVT estimator.

Events such as intentional attacks (e.g. spoofing, jamming) and/or environmental disruptions (e.g. geomagnetic storms, satellite blockage due to dense terrain) can affect the reliability of observations (e.g., observations 208), which in turn, can affect the reliability, accuracy, or other aspects of a given PVT estimate. A change in reliability of the observations can be detected through anti-spoofing modules, such as anti-spoofing modules 220 of FIG. 2, as discussed above. In some embodiments, anti-spoofing modules can monitor observations to determine whether the observations may be unreliable based on the trends of past observations.

Anti-spoofing modules can use monitors (e.g. speed, velocity, power monitors) to implement threshold-based approaches to determine the reliability of observations. Anti-spoofing modules that implement threshold-based approaches can generate a fault, for example, when N out of the last M (e.g. 3 out of 4) observations have changed by an increment that is over a set threshold. An associated fault would indicate to the user or connected system that observations have changed by an amount that exceeds the threshold. Similarly, a fault can be triggered when the value associated with an observation is over a predetermined threshold.

Figure 6:
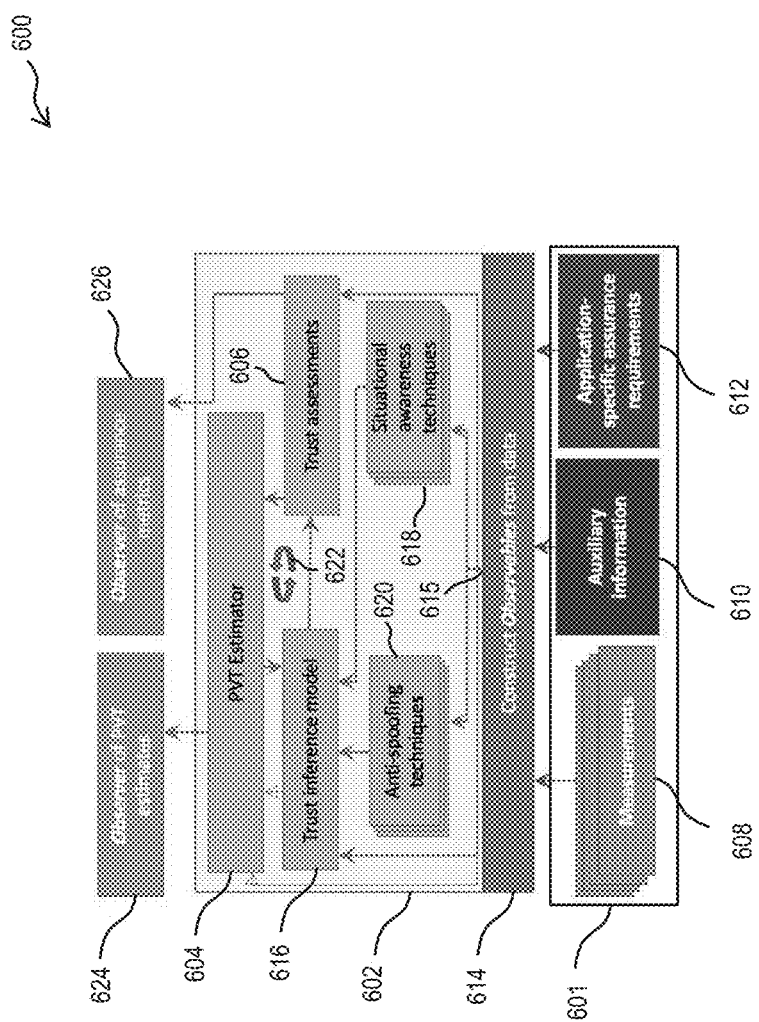
FIG. 6 is a functional block diagram illustrating a PVT estimate generator using anti-spoofing assessments, according to some embodiments.

However, instead of relying on threshold-based approaches (or in addition to threshold-based approaches), some embodiments can include anti-spoofing assessments or other types of inconsistency tests that rely on probabilistic procedures to determine the reliability of observations. FIG. 6 is a functional block diagram of a system 600 that is configured to use probabilistic procedures for PVT estimate and assurance metric generation.

System 600 can generate PVT estimates with assurance metrics based on various inputs 601 using probabilistic methods. System 600 includes a PVT engine 602 that generates PVT estimates and assurance metrics from the inputs 601 and outputs the PVT estimates and assurance metrics through the PVT output 624 and the assurance metrics output 626, respectively. The PVT engine 602 includes anti-spoofing module 620, situational awareness module 618, trust inference module 616, trust assessment module 606, and PVT estimation module 604. These are functional modules that can be implemented via software executing on one or more processors. Each of the anti-spoofing module 620, situational awareness module 618, trust inference module 616, trust assessment module 606, and PVT estimation module 604 are implemented using probabilistic procedures.

According to various embodiments, the core of PVT assurance metrics and PVT estimators are probabilistic programs that specify how all the various sources must be combined to produce an estimate. Probabilistic programs describe not only how to combine sources of information, but more generally, how to combine probabilistic algorithms. Anti-spoofing techniques, situational awareness techniques, trust updating models, PVT estimators, and PVT assurance metrics, all are specified via probabilistic procedures, which are probabilistic programs with random execution-trace semantics that define a probability distribution on a set of possible executions of a program. The "outputs" of such programs correspond to samples drawn from the probability distribution defined by those programs.

The inputs 601 can include observations 608, auxiliary information 610, and application-specific requirements 612. Referring to FIG. 1, these inputs can be provided, for example, by observers 106, local and/or remote databases 114, 116, and platform configuration inputs 120. Observations 608 are inputs that can include readings from sensors, satellite data in digital form, features extracted from baseband information, and, in general, any digital information that can be leveraged for anti-spoofing algorithms, situational awareness, or to estimate a PVT solution. According to some embodiments, anti-spoofing algorithms can inspect analog signals, and the digital output from such algorithms is an observation input to the PVT engine 602.

The PVT engine 602 uses probabilistic programs to provide PVT estimates with assurance metrics to, for example, users and/or connected systems. Similar to PVT engine 202, the PVT engine 602 can reduce the influence of unreliable observations (e.g. spoofed observations) on the PVT estimate. PVT engine 602 can also output a corresponding assurance metric that describes the confidence level associated with a PVT estimate. For example, a PVT estimate based on observations 608 that are significantly altered by attacks or environmental disruptions can yield a low assurance metric. The low assurance metric can be used to notify users or connected systems that the PVT estimate is not trustworthy and the assurance metric can also provide a description of why the PVT estimate is not trustworthy.

The PVT engine 602 includes a PVT estimation module 604 that can include one or more algorithms to infer PVT estimates based on the inputs 601 and based on trust assessments generated by the trust assessment module 606. The PVT estimation module 604 can output the PVT estimate to the PVT output 624 for observation by a user and/or downstream application and can output a PVT estimate to the trust inference module 616.

Information from inputs 601 used by the PVT estimation module 604 to generate a PVT estimate can be affected by events such as intentional attacks (e.g. spoofing, jamming) and/or environmental disruptions (e.g. geomagnetic storms, satellite blockage due to dense terrain), which can, in turn, affect the reliability, accuracy, or other aspect of a given PVT estimate. As noted above, an assessment of the reliability of an observation can be made using anti-spoofing modules and other types of modules that test for inconsistencies in the observations (e.g., between an observation and a previous observation from the same observer, between observations of different observers, or between an observation and verification information). Changes can also be detected using situational awareness assessments, which can include monitoring external factors (e.g. monitors experiencing loss of power or intermittent power, and/or changes in noise sources) that affect observations.

For evaluating the reliability of the inputs 601, PVT engine 602 can include anti-spoofing module 620 and situational awareness module 618. Each of these modules can implement functional probabilistic algorithms for generating probability distributions associated with one or more of the inputs 601. According to some embodiments, the inputs 601 are constructed into observable streams 615, as indicated by reference numeral 614 in FIG. 6, for use by functional probabilistic algorithms of the anti-spoofing module 620 and situational awareness module 618 (as well as other modules, as discussed further below).

According to some embodiments, the anti-spoofing module 620 and situational awareness module 618 can analyze information from inputs 601 by generating at least two probability distributions and comparing them to one another for consistency. One of the probability distributions can characterize the probability that an event occurs based on the observations (e.g. observations 208, 608) before an experiment (e.g. monitoring speed, velocity, power) is performed—this is the prior probability of an event. Another probability distribution can take into account new "evidence" from an experiment—this is the posterior probability of an event. For example, the prior probability can be based on inputs 601, whereas the posterior probability can be based on inputs 601 combined with the results of monitors implemented within the anti-spoofing and situational awareness modules 620, 618. In some embodiments, a PVT estimate generator can implement both a probabilistic-based and threshold-based approaches.

Anti-spoofing modules 620 can implement probabilistic-based anti-spoofing assessments. For example, the anti-spoofing modules 620 can determine the probability that one or more of observations 608 is spoofed based on prior and posterior probabilities. The situational awareness modules 618 can also implement probabilistic-based situational awareness assessments. For example, the situational awareness modules 618 can determine the probability that external factors (e.g. intermittent power of power loss to communication lines that supply observations or that are monitoring observations) affect the reliability of the observations.

The results generated by the anti-spoofing module 620 and the situational awareness module 618 can be probability distributions associated with the observations 608, and these probability distributions can be provided to a trust inference module 616. A given distribution can provide the probabilities of various conclusions or assumptions about the observations 608 given the model implemented in the respective anti-spoofing module 620 and the situational awareness module 618. For example, a distribution output by the anti-spoofing module 620 can include the probability that that signal M of N GPS signals provided to the PVT engine 602 as observations is spoofed based on an anti-spoofing algorithm implemented in the anti-spoofing module 620.

The trust inference module 616 can include definitions of how inputs 601 are related to each other and how the inputs 601 can be combined into a PVT estimate trust assessment for a given PVT estimate generated by the PVT estimation module 604. For example, the trust inference module 616 can define whether or not to trust one or more observations 608 more than another or to trust all observations 608 equally. The trust inference module 616 can also define relationships between the inputs 601. For example, the trust inference module 616 can define relationships between the observations 608 and auxiliary information 610 (such as map information that includes terrain and/or altitude information).

According to some embodiments, the trust inference module 616 can define relationships that describe how inputs 601 and the results from anti-spoofing assessment modules 620 and/or situational awareness assessment modules 618 are related to each other and how they can be combined to generate a PVT estimate. For example, if a trust inference module 616 receives an application-specific requirement that a PVT estimate is acceptable if the estimate is not generated from any spoofed signals and receives another application-specific requirement that accuracy of the PVT estimate is to be prioritized over availability, then the trust inference module 616 can relate these two application-specific requirements with the anti-spoofing assessment of the inputs 601 and feed this relationship to a trust assessment module 606.

The trust assessment module 606 can then generate assurance metrics that indicate the trust in a PVT estimate generated by the PVT estimation module 604 according to, for example, the particular application-specific assurance requirements. According to some embodiments, if the trust assessment module 606 outputs an assurance metric indicating that a given signal is spoofed, then this information can be provided to a user, connected system, or downstream application via the assurance metrics output 626, but this information can also feed back into the trust inference module 616 to exclude the spoofed signal from the PVT estimate.

According to some embodiments, the trust assessment module 606 can receive information from inputs 601 via observable streams 615 and can receive various relationships from the trust inference module 616. The various relationships can include relationships between the inputs 601 and relationships between the inputs 601 and the results from the anti-spoofing and/or the situational awareness modules 620, 618. The trust assessment module 606 can use the observable streams 615 and the various relationships to assess the trust of observables 608. The trust assessment module 606 can feed a probability distribution, a number, and/or a number that describes the trust assessment of observations 608 into a PVT estimation module 604, which generates the PVT estimate.

Modules of the PVT engine 602 can transmit information between one another via queries, which as explained above, can generate the probability that a particular object exists, or more generally, the probability that a particular statement is true. Queries can be viewed as enabling a feedback loop 622 between the PVT estimation module 604, trust assessment module 606, and the trust inference module 616. The trust inference module 616 can be queried one or more times by the trust assessment module 606 for assessing the impact of observations on a given PVT estimate based on the anti-spoofing techniques and the situational awareness techniques, the trust assessment module 606 can be queried one or more times by the PVT estimation module 604 for determining how observations should be used for a generated PVT estimate (e.g., whether the influence of an observation on a PVT estimate should be reduced or eliminated), and the PVT estimation module 604, anti-spoofing module 620, and situational awareness module 618 can each be queried one or more times by the trust inference module 616 for evaluating a state of observations for generating trust assessments for PVT estimates generated from those observations. The answer to a query can be a number or a probability distribution that feeds back into the module that generated the query.

The use of queries can depend on the assurance metric that describes the trust assessment. For example, an assurance metric that describes a high trust assessment may not warrant a query. However, an assurance metric that indicates a low trust assessment may warrant one or more queries to the trust inference engine about a specific PVT estimate and its assurance metric. Queries can generate answers based one or more conditional probability statements. For example, a query can ask the following: given a particular set of observations, what is probability of estimating a PVT with high integrity (e.g. p(PVT with integrity|observations)) or given a particular set of observations, what is probability of estimating an accurate PVT (e.g. p(Accuracy of the PVT<threshold|observations)).

According to some embodiment, the PVT estimates are received by the user or connected systems through PVT output 624 and the assurance metrics are received by the user or connected systems through assurance metric output 626. The assurance metric for the PVT estimate describes whether the user should or should not trust the PVT estimate and describes the level of trustworthiness of the PVT estimate. The PVT estimate can be sent to the PVT output 624, for example, as audio signals to be broadcast over a radio, as visual signals for display on a mobile device, and/or as data signals that serve as inputs for a connected system. According to some embodiments, the assurance metric of the PVT estimate can be made available to the users or connected systems through a button or menu option that when selected will describe why the PVT estimate corresponds to a given assurance metric. For example, if the assurance metric is low and a user selects an option to learn more about the low assurance metric, then the selected option can inform the user of the reasoning for the low assurance metric.

Figure 7:
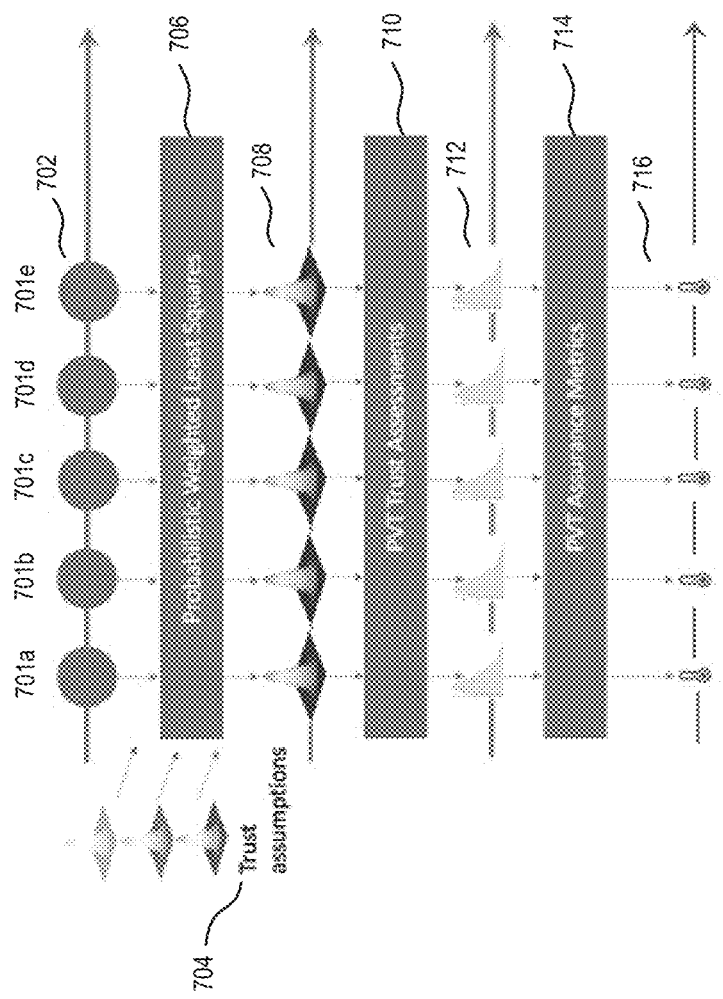
FIG. 7 is a diagram of dataflow in a PVT engine, according to an embodiment.

FIG. 7 is an exemplary diagram of dataflow through a probabilistic PVT engine, such as PVT engine 602 of FIG. 6, according to various embodiments. The inputs and outputs of a PVT engine can be data streams. For example, pseudoranges or IMU (Inertial Measurement Unit) measurements can be data streams, and also, periodic position, velocity and time estimates can be data streams. Data streams can also be sequences of probability distributions, which can be sampled by one or more modules of the PVT engine. Probabilistic programs implemented in one or more modules of a PVT engine, describe probability distributions conditioned on observations—i.e., input data streams. Thus, modules of PVT engines can generally transform data streams of values and/or probability distributions into data streams of probability distributions. Probabilistic programming systems, such as Anglican or Pyro, can be used to implement operations on probability distributions implemented in one or more modules of a PVT engine, according to various embodiments.

Streams of data can be represented by a vector. For example, a stream of data can be a vector of pseudo-ranges. Such streams can be transformed by an operator (e.g., PVT estimator 604). For example, PVT estimator 604 may compute a PVT estimate using a probabilistic version of the well-known weighted least squares method based on a vector of pseudo-ranges. The output of such an operator is then a stream of PVT posterior distributions. This new stream can be transformed by yet another operator that, for example, turns the stream of PVT posteriors into a stream of trust posterior distributions or predictions.

Modules, such as anti-spoofing module 620, situational awareness module 618, trust inference module 616, trust assessment module 606, and PVT estimation module 604, implement one or more operators that utilize a probabilistic programming inference system, such as Anglican or Pyro. Such systems can implement inference methods, such as, Markov chain Monte Carlo (MCMC), Particle MCMC, importance sampling, and Stochastic Variational Inference. These inference approaches can be used to approximate the probability distributions specified by probabilistic programs. These algorithms can generate approximate answers to an inference task. These approximations can correspond to a numeric trust score, a PVT estimate, or in some cases, a concrete action or recommendation. This is discussed further below with reference to the dataflow diagram of FIG. 7.

The PVT engine can take in observation streams 702 that include different observations 701a-e and output the corresponding PVT estimate and assurance associated with each observation 701a-e of the observation streams 702. According to some embodiments, the observation streams 702 can include information such as the previously described information associated with observations 208, 608. The observation streams 702 can also include probability distributions that functional probabilistic modules of a PVT engine can sample to extract information for generating PVT estimates with assurance.

According to some embodiments, a PVT estimator, such as PVT estimation module 604, generates a stream of posterior probability distributions 708 based on one or more observations 701a-e. In the example illustrated in the PVT estimator uses a probabilistic weighted least squares regression algorithm 706 to reduce the influence of unreliable observations. The probabilistic weighted least squares module 706 can take in observation streams 702 and trust assumptions 704 associated with the observations.

A trust assumption 704 is a prior belief about the truthfulness of an assertion. Such prior beliefs can be expressed using statements that describe probability distributions. Examples of assertions include:

Position(epoch)=(lat,long,alt); for specific values of epoch,lat,long,alt.

IPosition(epoch)−(latjong,alt)||<ε; for specific values of epoch,lat,long,alt,ε.

Manipulated(input)=False. Where Manipulated(input) describes whether a specific input, e.g., a satellite signal, has been manipulated by an adversary.

Thus, an example of a trust assumption is some prior distribution for p(Manipulated(input)=False), which could be dependent on several factors, including threat assessments, situational awareness, etc.

The trust assumptions 704 can include, for example, that a particular satellite should be trusted less if it has a higher leverage than it should compared to an average leverage. The concept of leverage is discussed previously in regards to AWLS. Another example of a trust assumption 704 can include the expected distribution of the observations based on past observations. According to some embodiments, the trust assumptions 704 can be included, for example, as application-specific requirements 612 for system 600.

According to some embodiments, the probabilistic weighted least squares module 706 outputs a stream of posterior probability distributions 708 that takes into account "new evidence" associated with observations 702 and is conditional on the observations 702. The posterior probability distributions 708 can be sampled by a trust inference module (not shown). The trust inference module can define relationships, for example, between the observations 702, trust assumptions 704, and/or the posterior probability distributions and output these relationships to the trust assessment module 710.

A trust assessment generated by the trust assessment module 710 is a posterior belief about the truthfulness of an assertion. An example of a trust assessment is:

p(Manipulated(input)=False|D,m)=0.73; where D is some data and m describes a class of probability models.

Trust assessments are associated with concrete assertions, models, and observations. To obtain a number, label, or representation suitable for decision making, trust assessments are transformed into assurance metrics.

The trust assessment module 710 can sample from the relationships, posterior probability distributions 708, observations 702, and trust assumptions 704 to generate a stream of trust assessments 712. According to some embodiments, the stream of trust assessments 712 can feed back into the trust inference module (not shown) similarly to loop 622 shown in FIG. 6.

According to some embodiments, the stream of trust assessments 712 can be sampled by an assurance metric module 714 to generate a stream of numeric and/or categorical assurance metrics 716. The assurance metrics module 714 can be used to convert probability distributions into numbers and/or categorical values 716 that reflect the confidence in the trust assessments. According to some embodiments, the trust assessment module 710 can include the assurance metrics module 714.

Figure 8:
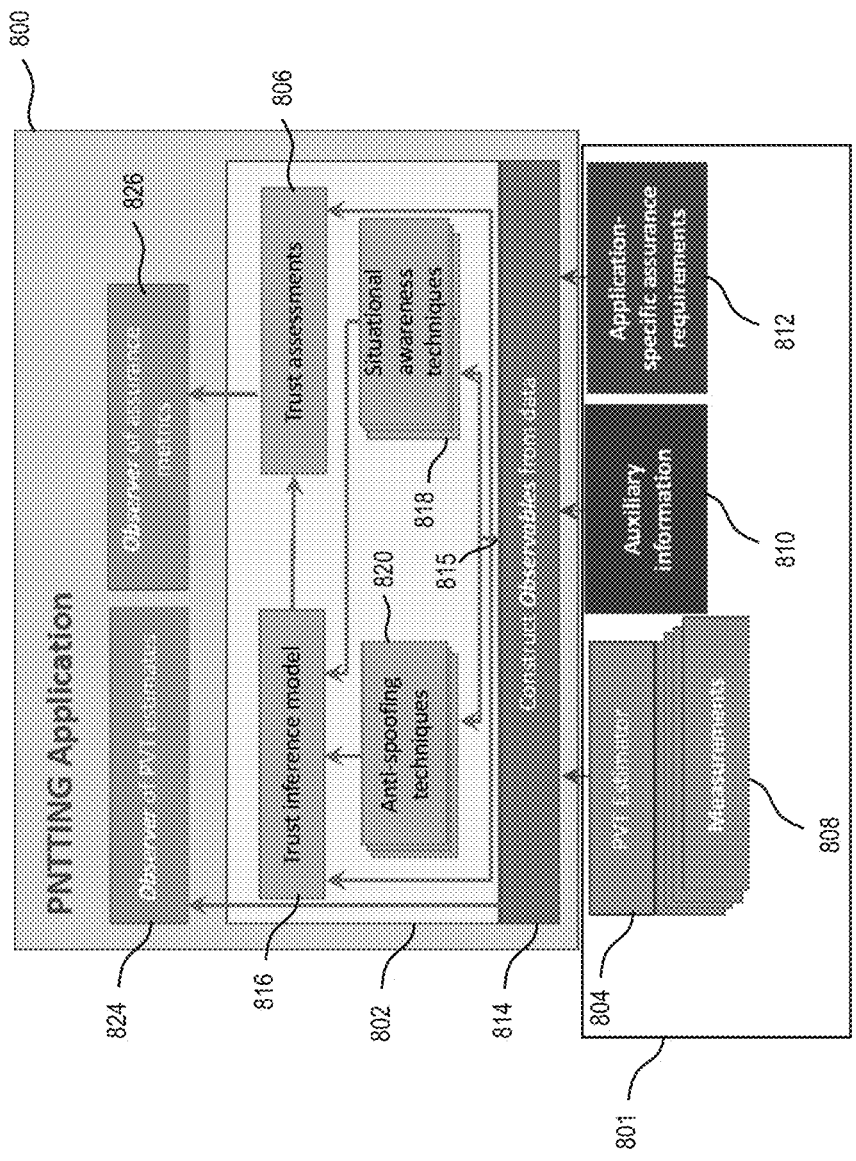
FIG. 8 is a functional block diagram illustrating a PVT estimate generator using anti-spoofing assessments, according to some embodiments.

FIG. 8 is a functional block diagram of a system 800 in which PVT estimates are provided as an input. System 800 can include one or more processors executing one or more programs stored in memory to implement the functions represented in FIG. 8 and described below. System 800 can be implemented, for example, on a moving platform, such as a vehicle, or in handheld equipment configured for carrying by a user.

In the embodiment of FIG. 8, system 800 receives, as an input, PVT estimates from a PVT estimation module 804. In other words, unlike systems 200 and 600 of FIGS. 2 and 6, respectively, system 800 does not have a PVT estimation module built in. System 800 relies on pre-computed PVT estimates to be supplied as an input. Other inputs 801 into system 800 can include observations 808, auxiliary information 810, and/or application-specific assurance requirements 812.

System 800 includes an assurance metric generator 802 that generates assurance metrics for the PVT estimates that are received from PVT estimation module 804. According to some embodiments, to be made readable by the functional probabilistic modules of the assurance metric generator 802, inputs 801 are constructed into observable streams 815 by the observable constructor 814. The functional probabilistic modules can include one or more anti-spoofing assessment modules 820, one or more situational awareness modules 818, a trust inference module 816, and/or a trust assessment module 806. The assurance metric generator 802 takes in the observable streams 815, passes the pre-computed PVT estimate to the PVT output 824 and outputs a PVT assurance metric to the assurance metric output 826 based at least partially on the observable streams 815. Pre-computed PVT estimates supplied to system 800 enable determination of assurance metrics for known PVT estimates.

As stated above and unlike system 600, system 800 receives PVT estimates as an input and these estimates are provided to the assurance metric generator 802. System 800 can be suitable, for example, for situations where the PVT estimates are pre-computed outside system 800, for example, by a third-party or off-the-shelf PVT estimator, and a user wants to know if and how they should trust the pre-computed PVT estimate. For example, PVT estimates computed from GPS messages using a weighted least squares estimation module can serve as inputs into system 800 to notify the user or connected systems if the reliability of the GPS messages. Thus, in these embodiments, the PVT estimates are not generated based on trust inference models, anti-spoofing techniques, trust assessments, or situational techniques, but the assurance metrics can still be provided for the PVT estimates.

The assurance metric generator 802 of system 800 can include a probabilistic anti-spoofing assessment module 820, a probabilistic situational awareness assessment module 818, a trust inference module 816, and a trust a trust assessment module 806, which operate in much the same way as discussed above with respect to PVT engine 602 of FIG. 6. Therefore, for brevity, these components are not discussed again here.

Figure 9:
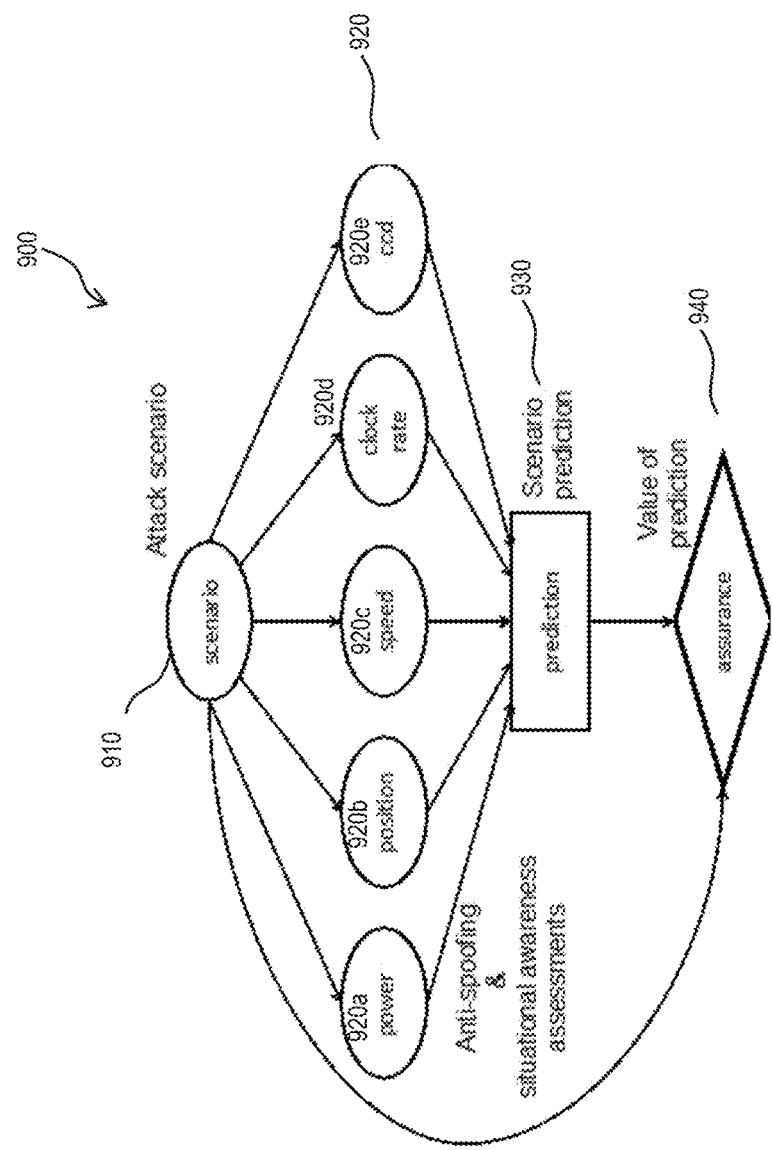
FIG. 9 illustrates a diagram of modules of a PVT engine, according to some embodiments.

FIG. 9 is an exemplary diagram 900 that illustrates an embodiment of modules that can be implemented by a probabilistic PVT engine, such as PVT engine 602 of FIG. 6, to generate PVT estimates with assurance. The inference diagram 900 shows how a PVT estimate with assurance can be generated based on a series of modules that can include anti-spoofing and situational awareness assessments 920, scenario prediction 930, and assurance determination 940. The anti-spoofing and situation awareness assessments 920 can be included, for example, in anti-spoofing and situational awareness modules 620, 618, 820, 818 of PVT engine 602 and assurance metric generator 802. The scenario prediction 930 can be included, for example, in the trust inference modules 616, 816 of PVT engine 602 and assurance metric generator 802. The assurance determination 940 can be included, for example, in the trust assessment modules 606, 806 of PVT engine 602 and assurance metric generator 802.

In the inference diagram 900 the ovals 910, 920 represent chance nodes, the rectangle 930 represents a decision node, and the diamond 940 represents a value node. The arrows connecting the various nodes represent the relationship between the nodes. According to some embodiments, the chance nodes correspond to random variables that can depend on models, an actual scenario, and specified assumptions that specify how certain faults describe an attack scenario. The chance nodes include the scenario 910, which can take in, for example, values that indicate the scenario 910 is normal (no spoofing), or values that describe a scenario 910 wherein the position and velocity are spoofed, and/or values that describe a scenario 910 wherein the clock rate is spoofed. The chance nodes can include anti-spoofing assessments 920 based on position 920b, speed 920c, clock rate 920d, and CCD monitors 920e that monitor the observations (e.g. data from which the scenario depends such as observations 608, 808) to determine whether the observations may be unreliable based on the trends of past observations. The chance nodes can also include situational awareness assessment based on power monitors 920a to monitor external factors that affect the reliability of observations.

According to some embodiments, the decision node corresponds to the scenario prediction 930. The scenario prediction 930 can include the determination of whether the information from the anti-spoofing and/or situational awareness assessment modules 920 show any degree of unreliability. The degree of unreliability is based on the probability of a particular combination of variables (chance nodes) given trust assumptions of the scenario 910. Trust assumptions can include, for example, the degree to which a power monitor is to be trusted compared to another type of monitor (e.g. position, speed). For example, a trust assumption can be that a power monitor has a relatively low probability of a false alarm and that a position monitor has a relatively high probability of a false alarm. A false alarm describes a fault that is generated when there is no attack. The degree to which a certain monitor may be prone to false alarms can be used to decide (at the decision node 930) if an attack has occurred. For example, the decision node 930 can take into account that the presence of a position fault is less likely to be indicative of an actual attack compared to a power fault which will have a higher probability of being indicative of an actual attack. The trust assumptions can also include that a particular set of observations should match an expected distribution. The value node 940 corresponds to assurance, which describes the assurance metric for the scenario prediction 930 at the decision node 930.

Figure 10:
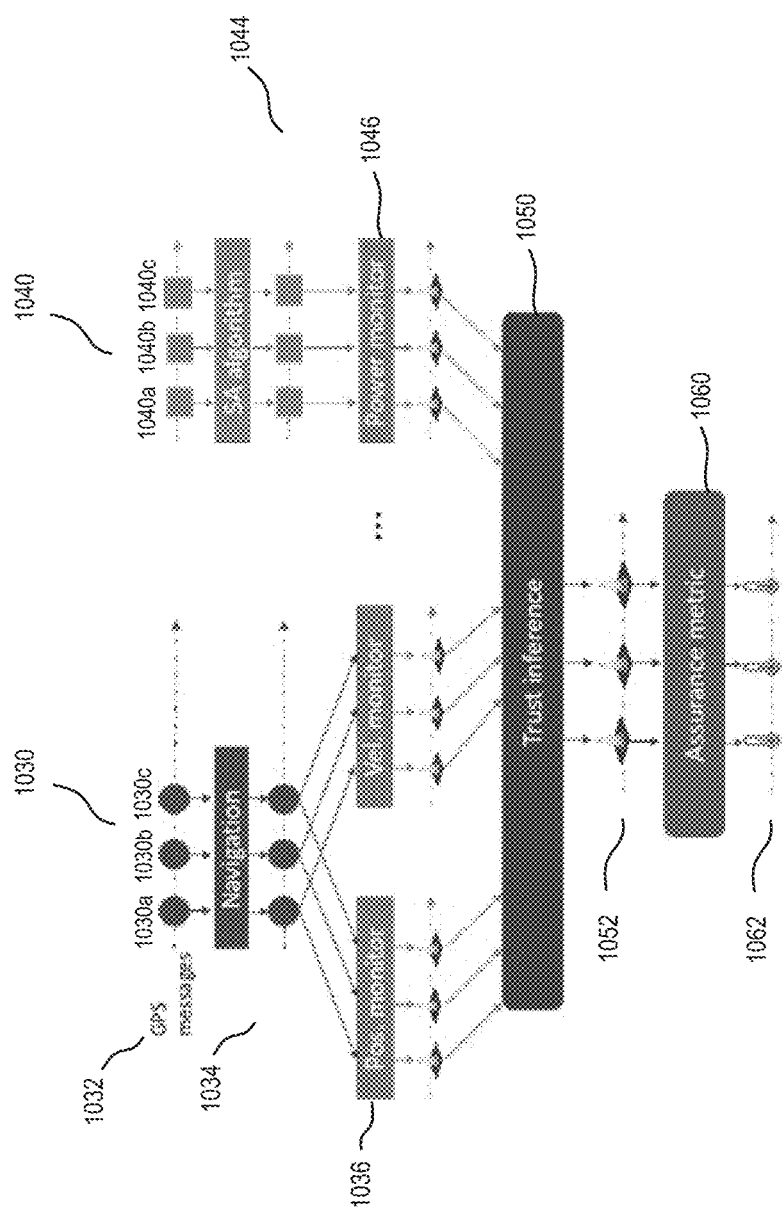
FIG. 10 is a diagram of dataflow in a PVT engine, according to some embodiments.

FIG. 10 is an exemplary diagram of dataflow through a PVT assurance metric estimate generator and can include one or more features illustrated in the exemplary dataflow diagram of FIG. 7 and one or more features illustrated in the inference diagram of FIG. 9. For example, in the embodiment of a PVT assurance metric estimate generator illustrated in FIG. 10, the observations streams 1034 can include pre-computed PVT estimates. The observation streams 1034 and situational awareness observations 1044 can be used to generate corresponding PVT assurance metrics associated with each pre-computed PVT estimates included in the observations stream 1034. The embodiment of a PVT assurance metric estimate generator illustrated in FIG. 10 can include use of multiple functional probabilistic modules, both in series (e.g. scenario prediction 930 and assurance 940) and in parallel (e.g. anti-spoofing and situational awareness assessment 920), that can be implemented by a probabilistic PVT engine to PVT assurance metrics for pre-computed PVT estimates.

FIG. 10 shows an example of dataflow and modules implemented by a PVT engine to generate PVT assurance metrics from pre-computed PVT estimates, according to some embodiments. The PVT engine can include functional probabilistic modules including anti-spoofing assessment modules 1036, situational awareness modules 1046, trust inference module 1050 and a trust assessment module 1060. The dataflow within the PVT engine can include two parallel flows that feed into a trust inference module 1050. One flow 1030 can be associated with the anti-spoofing assessment modules 1036. According to some embodiments, the anti-spoofing flow 1030 can include pre-computed PVT estimates 1034 that can be generated from GPS signals (1030a-c) using a weighted least squares estimation module. The pre-computed PVT estimates 1034 can be received by the anti-spoofing assessment modules 1036. Another flow 1040 can be associated with the situational awareness assessment modules 1046. According to some embodiments, the situational awareness flow 1040 can include situational awareness observations 1044 associated with the pre-computed PVT estimates that can be received by the situational awareness assessment module 1046. The anti-spoofing and situational awareness assessment modules 1036, 1046 can use various monitors (e.g. position, velocity, power monitors) to determine the probability that one or more of the pre-computed PVT estimates included within the observation stream 1034 may be unreliable based on the trends of past observations and also determine the probability that external factors change the reliability of the observations 1034.

According to some embodiments, the trust inference module 1050 can use the information from the various anti-spoofing and situational awareness modules 1036, 1046 to define relationships between the observations 1034 (that can include the pre-computed PVT estimates) and situational awareness observations 1044. The trust inference module 1050 can output a stream of posterior probability distributions 1052 that correspond to the stream of pre-computed PVT estimates. The stream of posterior probability distributions 1052 can be received by the assurance metric module 1060. The assurance metric module 1060 can convert the posterior probability distributions 1052 into numbers or categorical values 1062 that are indicative of the level of assurance.

Figure 11:
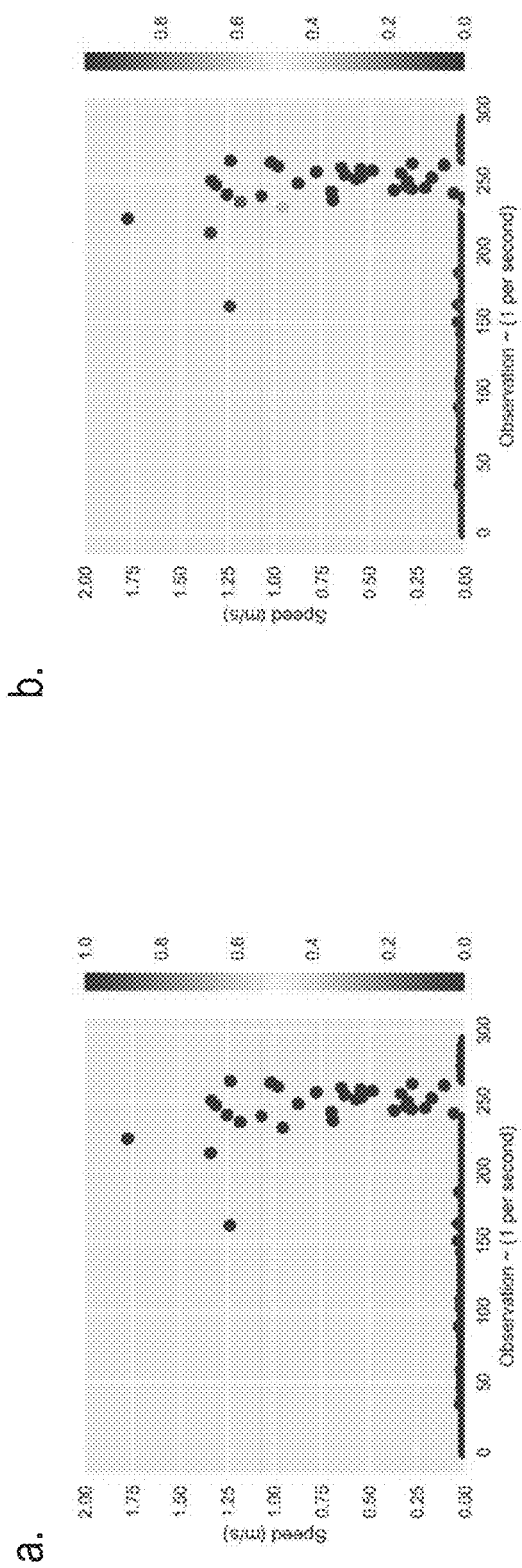
FIGS. 11a-b are plots of assurance metrics, according to some embodiments.

As described previously, various embodiments can implement anti-spoofing and situational awareness assessment modules as part of a probabilistic PVT engine while other embodiments can implement anti-spoofing and situational awareness assessment modules as inputs to a probabilistic PVT engine. For example, PVT engine 602 of FIG. 6 includes probabilistic anti-spoofing and situational awareness assessment modules while PVT engine 202 of FIG. 2 receives anti-spoofing assessments as an input. FIGS. 11a and 11b illustrate a difference between assurances that can result from implementing anti-spoofing assessments and/or situational awareness assessments as inputs to a PVT engine or as modules of a PVT engine, according to various embodiments.

FIG. 11a illustrates the effect on assurance metrics resulting from implementing a speed monitor (a type of anti-spoofing module) as an input to a PVT engine, an example of which is implemented in PVT estimate generator 200 of FIG. 2, while FIG. 11b shows the effect on assurance metrics resulting from including the speed monitor as a probabilistic module in the PVT engine, an example of which is implemented in. The examples of FIG. 11a and 11b show evidence of a spoofing attack that increased the speed of the platform (e.g., vehicle) for which PVT estimates were generated. The speed estimates were generated by the speed monitor anti-spoofing module from PVT estimates generated by the PVT estimator.

In FIG. 11a, the speed monitor is used as a data input and corresponds to a pre-determined anti-spoofing assessment. According to some embodiments, faults associated with the pre-determined anti-spoofing assessment may be supplied to the PVT engine or the faults may be computed by the PVT engine. The plot in FIG. 11a provides results generated by a PVT engine (e.g. PVT engine 202) that received inputs from a threshold-based Boolean fault system. The outputs of the threshold-based Boolean fault system can be considered pre-determined anti-spoofing assessments in reference to the PVT engine since they are received by the PVT engine. The results are plotted with speed (m/s) on the y-axis and the number of observations (taken approximately every second) on the x-axis. The plotted data points are color-coded based on the assurance metric color range provided to the right of the plot.

The pre-determined anti-spoofing assessment based on a speed monitor can, for example, determine that any speed over 0.5 m/s should generate a fault. A fault notifies the users or connected systems that there may be evidence of spoofing. In FIG. 11a, the threshold speed to generate a fault is set to 0.5 m/s. Thus, any value below this threshold can be trusted (colored dark green) and any value above the threshold cannot be trusted (colored dark red). Although the corresponding color-coded assurance metric ranges from 0 to 1, in a Boolean fault system only the two extreme values of 1 (no fault, dark green) and 0 (fault, dark red) can be used, for example, to indicate which observations should and should not be trusted in a threshold-based approach.

In FIG. 11a, around observation number 250, a spoofing attack drastically increases the speed of the PVT estimates. The threshold-based fault system does not register the attack—that is, the fault system does not indicate that the data points should be colored dark red—until the observations yield values over the threshold of 0.5 m/s. Thus, an attack can persist undetected as long as it is below the threshold value.

Depending on the level of sophistication, the threshold-based approach may not detect attacks that affect PVT estimates. For example, if an attacker affects the PVT estimate such that the PVT estimate remains under a given threshold, then a threshold-based fault will not be generated despite the presence of the attack. However, implementing a probabilistic-based approach, a fault can be generated if a certain amount of the PVT estimates do not correspond to the expected probability distribution, regardless if the values of the PVT estimates are under the threshold.

FIG. 11b shows an example plot of results obtained by implementing a probabilistic fault system in which the speed monitor is incorporated as a probabilistic monitor in the PVT engine—for example, as provided in PVT engine 602 of FIG. 6. The results are plotted with speed (m/s) on the y-axis and the number of observations (taken approximately every second) on the x-axis. The plotted data points are color-coded based on the assurance metric color scale to the right of the plot. FIG. 11b illustrates assurance metrics results from the same set of speed-observation data points shown in FIG. 11a.

In FIG. 11b, a speed monitor is used as a probabilistic anti-spoofing technique. In FIG. 11b, the speed-observation data points are plotted with a color-coding scheme based on an assurance metric that can range from 0 to 1. The color-coded assurance metric based on the probabilistic anti-spoofing speed monitor can utilize, for example, the extreme colors associated with values 0 (dark red) and 1 (dark green) and several color shades associated with values that fall between 0 and 1.

According to some embodiments, a probabilistic approach can identify the attack before the attack drastically affects the observations. In other words, a probabilistic approach can detect the onset of an attack. For example, in FIG. 11b, some observations around observation number 150 were tagged by the probabilistic PVT engine as untrustworthy before the observations began reporting a large increase in speed around observation number 250. In contrast, the threshold-based Boolean fault system of FIG. 11a did not detect the onset of the attack.

Figure 12:
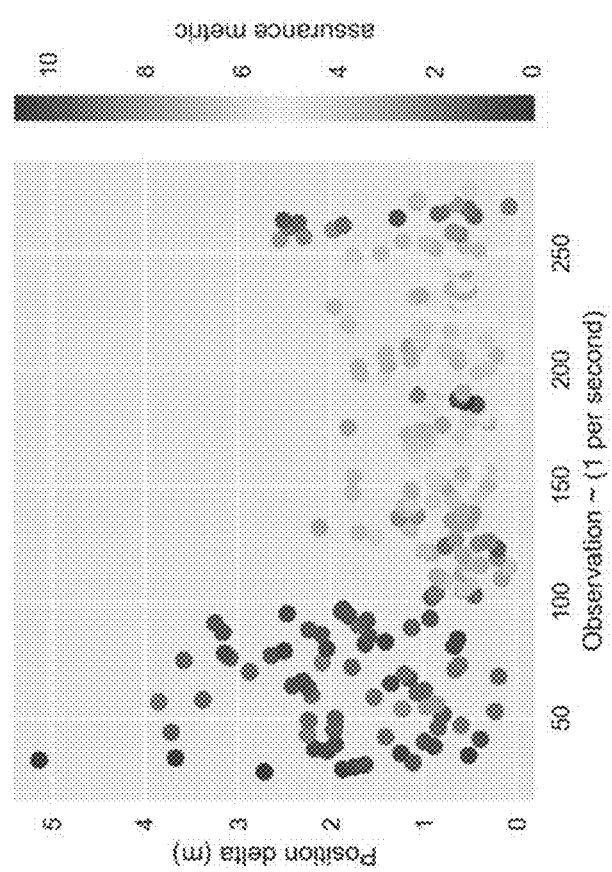
FIG. 12 is a plot of assurance metrics, according to some embodiments.

FIG. 12 shows an example of assurance metric results generated by implementing a probabilistic anti-spoofing assessment in a PVT engine, such as PVT engine 602 of FIG. 6 or assurance metric generator 802 of FIG. 8. The results are plotted with position delta (m) on the y-axis and the number of observations (taken approximately every second) on the x-axis. The plotted data points are color-coded based on the assurance metric color scale to the right of the plot.

The probabilistic anti-spoofing assessments of FIG. 12 are based on results from a position monitor. The results were generated by comparing an empirical distribution (based on observations) to an expected distribution. According to some embodiments, the expected distribution can be based on application-specific requirements 612, 812. For example, the application-specific requirement can include that the expected distribution should be have a particular shape. Based on the comparison of the empirical distribution to the expected distribution, an assurance value can be assigned the corresponding PVT estimate. The comparison between the distributions can include parameters such as shape and rate.

According to some embodiments, the scale of the assurance metric is not limited to any two numbers (e.g. 0-1 and 0-10). Instead, the scale can be between any two numbers or categories that describe something meaningful for a given mission with specified assurance requirements. In the example of FIG. 12, the assurance scale ranges between 0 and 10. Depending on the tasks of the mission and specified assurance requirements, the platform user may use the information from the assurance metric to determine subsequent actions. The subsequent actions may depend on where the assurance metric, that is associated with a given PVT estimate, falls within the scale of the assurance metric.

FIG. 12 shows an embodiment of a scenario wherein a normal operation (no evidence of spoofing) would yield a wider spread (approximately between 0 and 5 meters) of position deltas. However, FIG. 12 shows that around observation number 100, the spread of position deltas change. This can occur, for example, if the results of an attack yield a more narrow spread (approximately 0 to 2 meters). Such an attack would go undetected in a threshold-based approach if, for example, the threshold of the position delta is set to 5 meters. Thus, according to some embodiments, implementing a probabilistic-based anti-spoofing assessment in a probabilistic PVT engine can detect changes in distribution, for example, from the wider spread (that corresponds with the expected distribution) to a more narrow spread (that does not correspond with the expected distribution). The assurance metric scale can be used to indicate the degree to which the PVT estimates (e.g. speed, position delta) should or should not be trusted based on a probabilistic anti-spoofing assessment. Accordingly, a probabilistic PVT engine can also implement a probabilistic situational awareness assessment to generate reliable assurance metrics.

Figure 5:
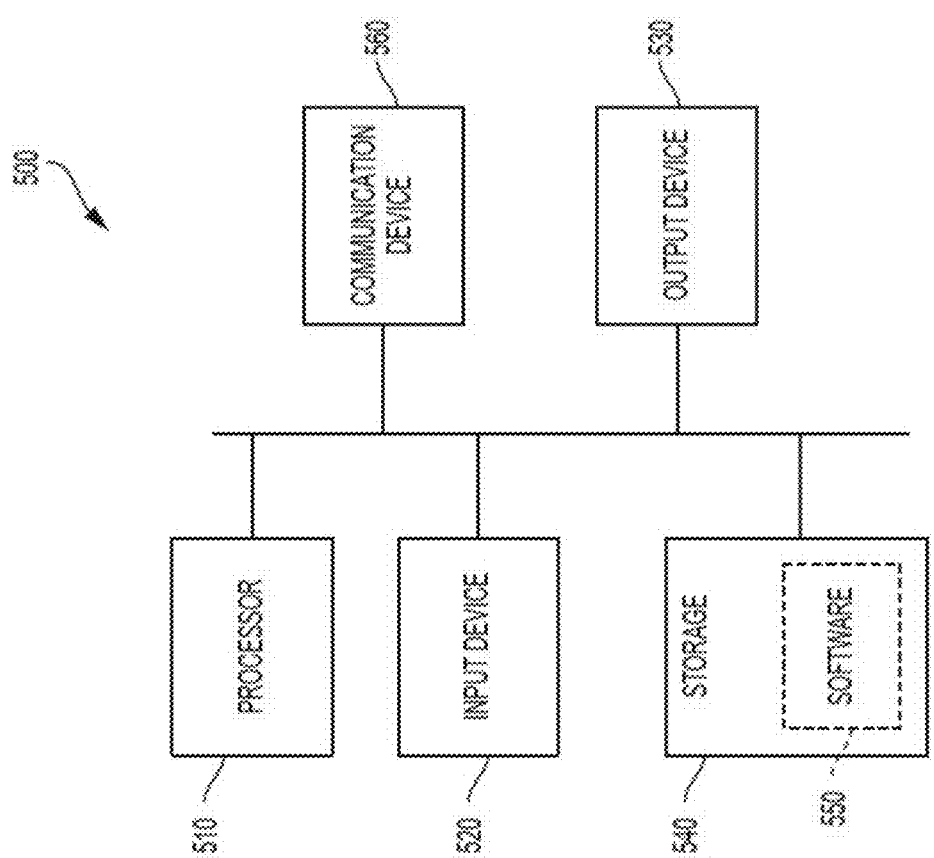
FIG. 5 is a block diagram of a computer, according to an embodiment.

FIG. 5 illustrates an example of a computing system in accordance with one embodiment. Computer 500 can be a component of a system for providing PVT estimates with assurance, according to the systems and methods described above, such as PVT estimate generator 102 of FIG. 1 or PVT estimate generator 600 of FIG. 6, or can include the entire system itself. In some embodiments, computer 500 is configured to perform a method for providing PVT estimates with assurance.

Computer 500 can be a host computer connected to a network. Computer 500 can be a client computer or a server. As shown in FIG. 5, computer 500 can be any suitable type of microprocessor-based device, such as a personal computer, workstation, server, or handheld computing device, such as a phone or tablet. The computer can include, for example, one or more of processor 510, input device 520, output device 530, storage 540, and communication device 560. Input device 520 and output device 530 can generally correspond to those described above and can either be connectable or integrated with the computer.

Input device 520 can be any suitable device that provides input, such as a touch screen or monitor, keyboard, mouse, or voice-recognition device. Output device 530 can be any suitable device that provides output, such as a touch screen, monitor, printer, disk drive, or speaker.

Storage 540 can be any suitable device that provides storage, such as an electrical, magnetic, or optical memory, including a RAM, cache, hard drive, CD-ROM drive, tape drive, or removable storage disk. Communication device 560 can include any suitable device capable of transmitting and receiving wireless and/or wired signals over a network, such as a network interface chip or card. The components of the computer can be connected in any suitable manner, such as via a physical bus or wirelessly. Storage 540 can be a non-transitory computer readable storage medium comprising one or more programs, which, when executed by one or more processors, such as processor 510, cause the one or more processors to perform methods described herein.

Software 550, which can be stored in storage 540 and executed by processor 510, can include, for example, the programming that embodies the functionality of the present disclosure (e.g., as embodied in the systems, computers, servers, and/or devices as described above). In some embodiments, software 550 can include a combination of servers such as application servers and database servers.

Software 550 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computer 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A mobile system comprising:
one or more antennas and one or more receivers for receiving global navigation satellite (GNSS) signals from a plurality of GNSS signal sources;
one or more processors;
memory; and
one or more programs, wherein the one or more programs are stored in the memory and configured to be executed by the one or more processors, the one or more programs including instructions for:
generating a plurality of position estimates based on at least pseudo-distances determined from at least some of the GNSS signals, wherein each position estimate is generated based on a different set of pseudo-distances,
determining an inconsistency associated with one or more of the position estimates based on verification information,
generating a trust assessment for each position estimate based on at least one determined inconsistency,
outputting a position estimate associated with a highest trust assessment as a position of the mobile system, and
reducing an influence of at least one of the GNSS signal sources on a future position estimate generation based on a lower trust assessment for position estimates generated based on a GNSS signal from the at least one GNSS signal source.

2. The system of claim 1, wherein generating the plurality of position estimates is based partially on inertial measurements from one or more inertial measurement units.

3. The system of claim 1, wherein determining an inconsistency comprises comparing at least a portion of a position estimate with an expectation about the position estimate that is derived from the verification information.

4. The system of claim 1, wherein the verification information comprises predetermined information associated with global positions.

5. The system of claim 1, wherein the verification information comprises information from one or more sensors on the mobile system.

6. The system of claim 1, wherein at least two inconsistency tests are applied to each position estimate to determine inconsistencies, the trust assessment for each position estimate is based on the at least two inconsistency tests, and the at least two inconsistency tests have different degrees of influence on the trust assessment.

7. The system of claim 1, wherein the trust assessments are generated using an open-universe probability model.

8. The system of claim 1, wherein the trust assessment is a probability that the position estimate satisfies at least one of integrity, availability, and continuity.

9. The system of claim 1, further comprising instructions for applying a GNSS signal spoof detector to detect a spoofed GNSS signal, wherein trust assessments for position estimates that are based on the spoofed GNSS signal are generated based on a level of trust associated with the GNSS signal spoof detector.

10. A method for determining position of a mobile system, the method comprising:
receiving global navigation satellite (GNSS) signals from a plurality of GNSS signal sources by a receiver of the mobile system;
generating a plurality of position estimates based on at least pseudo-distances determined from at least some of the GNSS signals, wherein each position estimate is generated based on a different set of pseudo-distances;
determining an inconsistency in one or more of the position estimates based on verification information;
generating a trust assessment for each position estimate based on determined inconsistencies;
outputting a position estimate associated with a higher trust assessment as a position of the mobile system; and
reducing an influence of at least one of the GNSS signal sources on a future position estimate generation based on a lower trust assessment for position estimates generated based on a GNSS signal from the at least one GNSS signal source.

11. The method of claim 10, wherein generating the plurality of position estimates is based partially on inertial measurements from one or more inertial measurement units.

12. The method of claim 10, wherein determining an inconsistency comprises comparing at least a portion of a position estimate with an expectation about the position estimate that is derived from the verification information.

13. The method of claim 10, wherein the verification information comprises predetermined information associated with global positions.

14. The method of claim 10, wherein the verification information comprises information from one or more sensors on the mobile system.

15. The method of claim 10, wherein at least two inconsistency tests are applied to each position estimate to determine inconsistencies, the trust assessment for each position estimate is based on the at least two inconsistency tests, and the at least two inconsistency tests have different degrees of influence on the trust assessment.

16. The method of claim 10, wherein the trust assessments are generated using an open-universe probability model.

17. The method of claim 10, wherein the trust assessment is a probability that the position estimate satisfies at least one of integrity, availability, and continuity.

18. The method of claim 10, further comprising applying a GNSS signal spoof detector to detect a spoofed GNSS signal, wherein trust assessments for position estimates that are based on the spoofed GNSS signal are generated based on a trust value associated with the GNSS signal spoof detector.

19. A non-transitory computer readable storage medium comprising one or more programs, which when executed by one or more processors of a mobile system, cause the one or more processors to perform a method comprising:
generating a plurality of position estimates based on at least pseudo-distances determined from at least some global navigation satellite (GNSS) signals received from a plurality of GNSS signal sources by a receiver of the mobile system, wherein each position estimate is generated based on a different set of pseudo-distances;
determining an inconsistency in one or more of the position estimates based on verification information;
generating a trust assessment for each position estimate based on determined inconsistencies;
outputting a position estimate associated with a higher trust assessment as a position of the mobile system; and
reducing an influence of at least one of the GNSS signal sources on a future position estimate generation based on a lower trust assessment for position estimates generated based on a GNSS signal from the at least one GNSS signal source.

20. The storage medium of claim 19, wherein generating the plurality of position estimates is based partially on inertial measurements from one or more inertial measurement units.

21. The storage medium of claim 19, wherein determining an inconsistency comprises comparing at least a portion of a position estimate with an expectation about the position estimate that is derived from the verification information.

22. The storage medium of claim 19, wherein the verification information comprises predetermined information associated with global positions.

23. The storage medium of claim 19, wherein the verification information comprises information from one or more sensors on the mobile system.

24. The storage medium of claim 19, wherein at least two inconsistency tests are applied to each position estimate to determine inconsistencies, the trust assessment for each position estimate is based on the at least two inconsistency tests, and the at least two inconsistency tests have different degrees of influence on the trust assessment.

25. The storage medium of claim 19, wherein the trust assessments are generated using an open-universe probability model.

26. The storage medium of claim 19, wherein the trust assessment is a probability that the position estimate satisfies at least one of integrity, availability, and continuity.

27. The storage medium of claim 19, wherein the method further comprises applying a GNSS signal spoof detector to detect a spoofed GNSS signal, wherein trust assessments for position estimates that are based on the spoofed GNSS signal are generated based on a trust value associated with the GNSS signal spoof detector.

* * * * *